United States Patent
Hwang

(10) Patent No.: US 12,267,739 B2
(45) Date of Patent: Apr. 1, 2025

(54) METHOD FOR OPERATING FAILURE TIMER DURING CONDITIONAL HANDOVER IN WIRELESS COMMUNICATION SYSTEM

(71) Applicant: Samsung Electronics Co., Ltd., Suwon-si (KR)

(72) Inventor: June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 17/312,879

(22) PCT Filed: Dec. 6, 2019

(86) PCT No.: PCT/KR2019/017187
§ 371 (c)(1),
(2) Date: Jun. 10, 2021

(87) PCT Pub. No.: WO2020/122509
PCT Pub. Date: Jun. 18, 2020

(65) Prior Publication Data
US 2022/0038976 A1 Feb. 3, 2022

(30) Foreign Application Priority Data
Dec. 14, 2018 (KR) .................. 10-2018-0162003

(51) Int. Cl.
*H04W 36/00* (2009.01)
*H04W 36/36* (2009.01)

(52) U.S. Cl.
CPC ..... *H04W 36/0079* (2018.08); *H04W 36/362* (2023.05)

(58) Field of Classification Search
CPC ................ H04W 36/30; H04Q 7/20
(Continued)

(56) References Cited

U.S. PATENT DOCUMENTS

| 10,939,329 B2 | 3/2021 | Wu et al. |
| 2007/0135125 A1 | 6/2007 | Kim et al. |

(Continued)

FOREIGN PATENT DOCUMENTS

| KR | 10-2007-0061755 A | 6/2007 |
| KR | 10-2018-0070233 A | 6/2018 |

(Continued)

OTHER PUBLICATIONS

Ericsson, "Overview on mobility robustness enhancements in LTE", 3GPP TSG-RAN WG2#104, Nov. 12-16, 2018, Tdoc R2-1817398, 5 pages.

(Continued)

*Primary Examiner* — Kiet M Doan

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Various embodiments of the present invention include a method for operating a failure timer during conditional handover in a wireless communication system and a method for operating channel occupation for mobility improvement in an unlicensed band.

6 Claims, 22 Drawing Sheets

(58) Field of Classification Search
USPC .................... 455/436, 440, 444; 370/332
See application file for complete search history.

(56) References Cited

U.S. PATENT DOCUMENTS

| | | | |
|---|---|---|---|
| 2015/0181493 A1* | 6/2015 | Park ................... | H04W 36/249 |
| | | | 455/436 |
| 2016/0309376 A1* | 10/2016 | Liu ..................... | H04W 24/08 |
| 2018/0176710 A1 | 6/2018 | Jang et al. | |
| 2018/0279193 A1* | 9/2018 | Park ................... | H04W 36/26 |
| 2018/0343689 A1 | 11/2018 | Wu et al. | |
| 2020/0077314 A1 | 3/2020 | Hwang et al. | |
| 2020/0187069 A1* | 6/2020 | Hong ............... | H04W 36/00837 |
| 2021/0321308 A1* | 10/2021 | Yang ................. | H04W 36/0064 |

FOREIGN PATENT DOCUMENTS

| | | |
|---|---|---|
| KR | 10-2018-0115849 A | 10/2018 |
| KR | 10-2018-0122963 A | 11/2018 |
| WO | 2018/170825 A1 | 9/2018 |

OTHER PUBLICATIONS

MediaTek Inc., "Conditional Handover Procedures", 3GPP TSG-RAN WG2 Meeting #104, Nov. 12-16, 2018, R2-1816959, 6 pages.
International Search Report dated Mar. 13, 2020 in connection with International Patent Application No. PCT/KR2019/017187, 2 pages.
Written Opinion of the International Searching Authority dated Mar. 13, 2020 in connection with International Patent Application No. PCT/KR2019/017187, 4 pages.
Office Action dated Feb. 7, 2024, in connection with Korean Application No. 10-2018-0162003, 11 pages.
Office Action dated Oct. 14, 2024, in connection with Korean Application No. 10-2018-0162003, 7 pages.
Decision of Patent dated Jan. 21, 2025, in connection with Korean Application No. 10-2018-0162003, 8 pages.

* cited by examiner

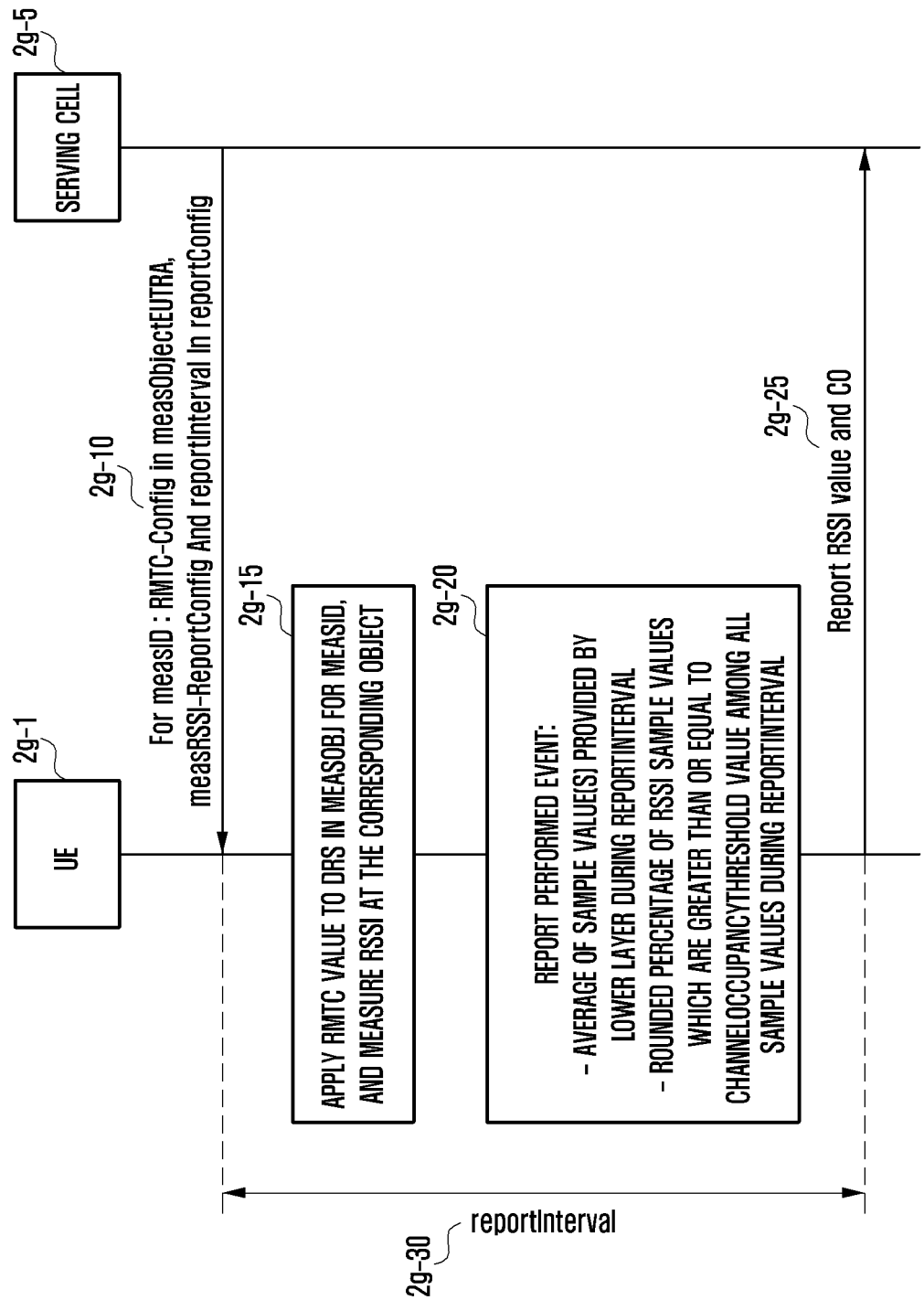

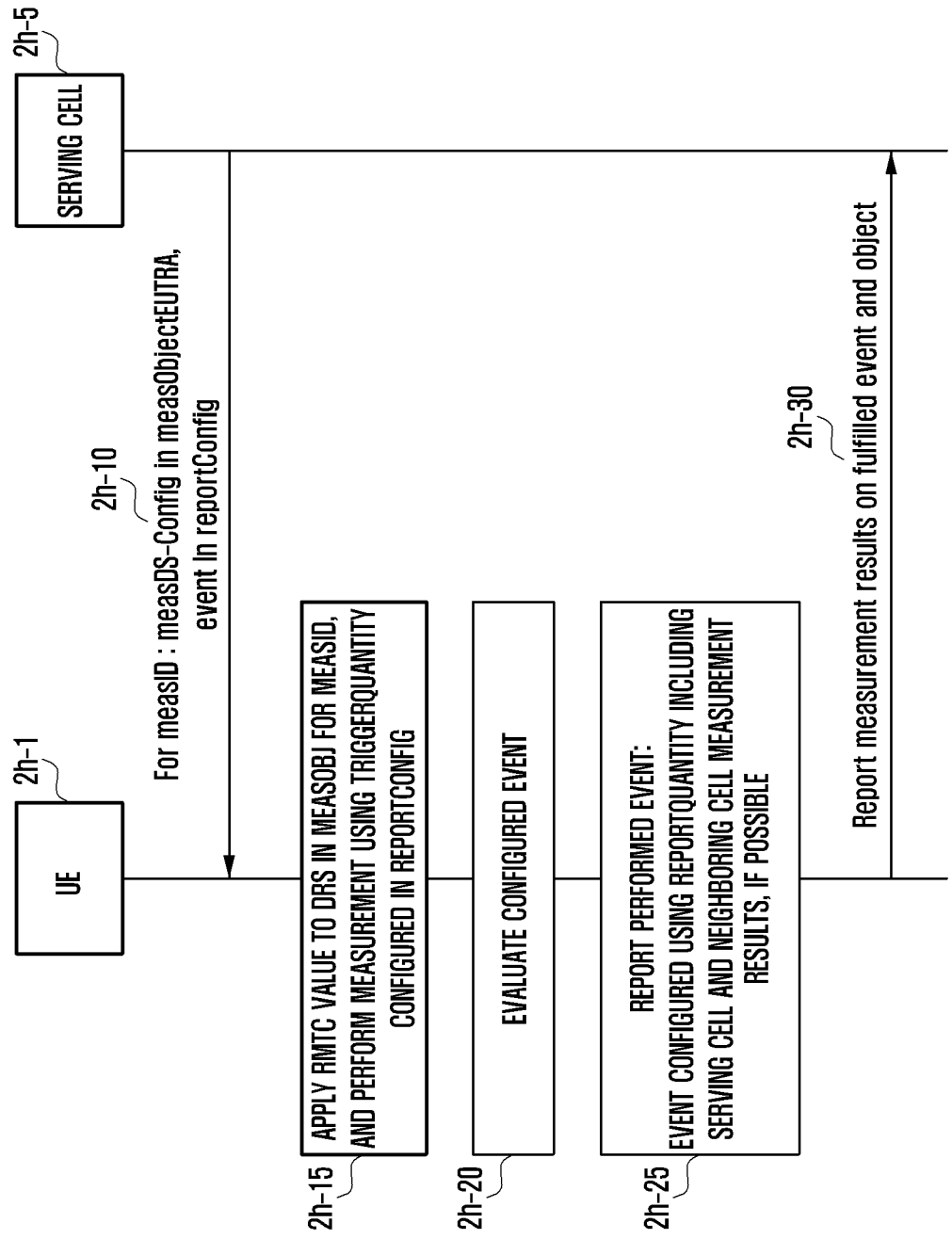

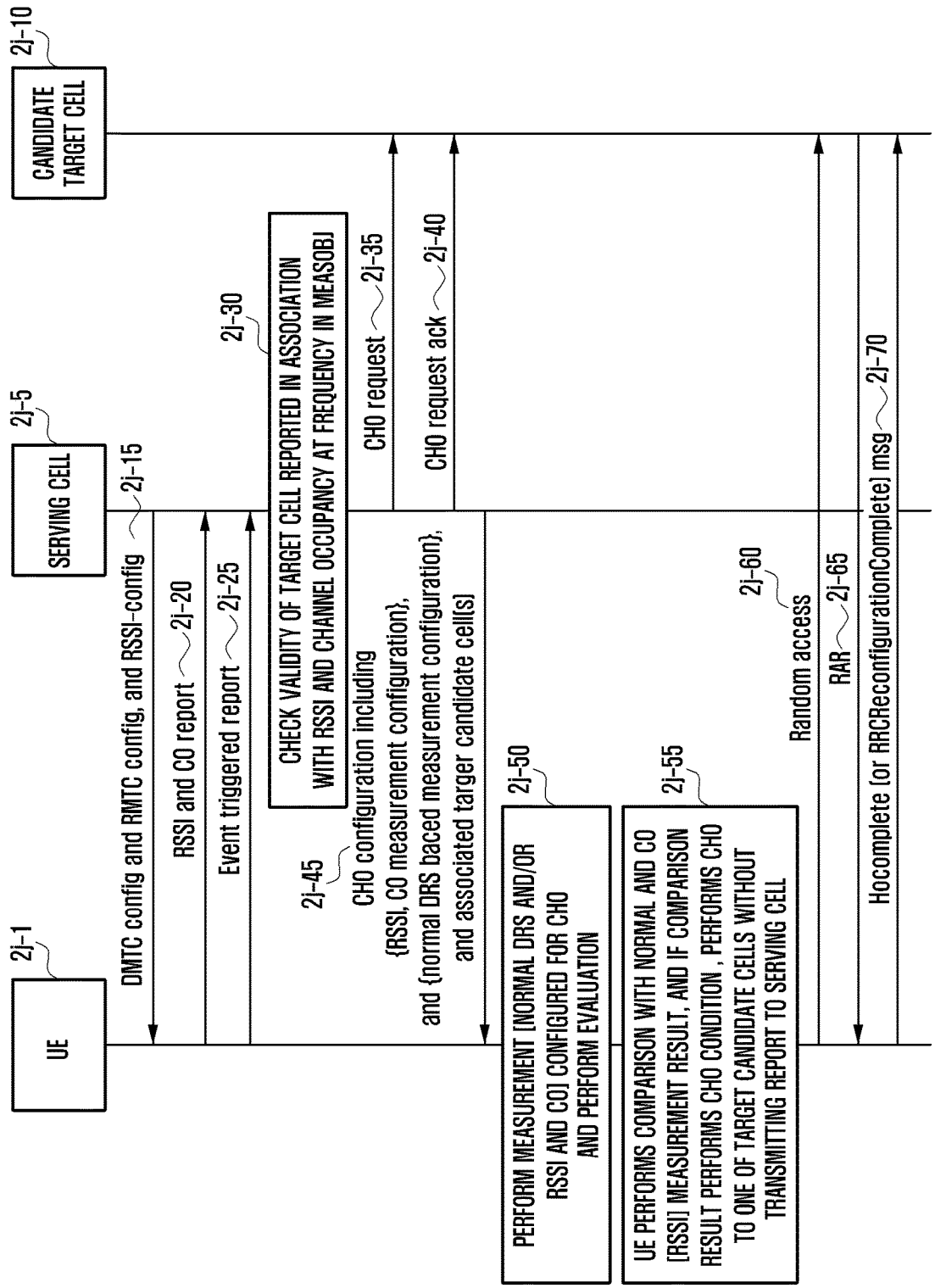

METHOD FOR OPERATING FAILURE TIMER DURING CONDITIONAL HANDOVER IN WIRELESS COMMUNICATION SYSTEM

CROSS-REFERENCE TO RELATED APPLICATIONS

This application is a 371 of International Application No. PCT/KR2019/017187 filed on Dec. 6, 2019, which claims priority to Korean Patent Application No. 10-2018-0162003 filed on Dec. 14, 2018, the disclosures of which are herein incorporated by reference in their entirety.

BACKGROUND

1. Field

The disclosure relates to a method of operating a failure timer when performing a conditional handover in a wireless communication system. In addition, the disclosure relates to a method of operating channel occupancy for improving mobility in an unlicensed band in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system, and requires to satisfy ultrahigh reliability (e.g., packet error rate of about 10-5) and low latency ability (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to efficiently provide these services.

Therefore, the disclosure has been made in view of the above-mentioned problems, and an aspect of the disclosure is to provide a method of detecting a conditional handover failure using a failure detecting timer given to a user equipment (UE), when operating a conditional handover, and processing the conditional handover failure.

In addition, an aspect of the disclosure is to provide a method and apparatus for effectively providing a service in a mobile communication system.

In addition, an aspect of the disclosure is to provide a channel occupancy method for improving mobility in an unlicensed band.

In addition, an aspect of the disclosure is to provide a method and apparatus for effectively providing a service in a mobile communication system.

The technical subject matter of the disclosure is not limited to the above-mentioned technical subject matters, and other technical subject matters which are not mentioned may be understood by those skilled in the art based on the following description.

SUMMARY

In accordance with an aspect of the disclosure, a method of processing a control signal in a wireless communication system may include: receiving a first control signal transmitted from a base station; processing the received first control signal; and transmitting, to the base station, a second control signal produced based on the processing.

According to an embodiment, the base station provides a timer value to a user equipment (UE), and a timer starts if a condition is satisfied. If access to a target cell is not successfully performed until the timer expires, it is regarded as a failure, a failure processing routine is performed, and a processing method for the UE is provided when a conditional handover fails.

According to an embodiment of the disclosure, in the case in which a base station provides a condition for performing a handover and target base station information to a UE, if a channel occupancy target information value and configuration information associated with an RSSI and channel occupancy measurement are provided, a UE may perform a conditional handover to a previously defined target cell if the condition for performing a handover is satisfied and the channel occupancy target condition is additionally satisfied, without separately reporting a channel occupancy result.

In accordance with an aspect of the disclosure, a method of a UE in a wireless communication system may include: receiving, from a serving cell, configuration information for a conditional handover to a target cell; determining whether at least one of conditions included in the configuration information for the conditional handover is satisfied; and if at least one of the conditions included in the configuration information for the conditional handover is satisfied, performing the conditional handover to the target cell, and starting a timer included in the configuration information.

According to some embodiments, the configuration information for the conditional handover may include configuration information for conditional handovers associated with a plurality of candidate target cells, and the method may further include, if at least one of the conditions included in the configuration information for the conditional handover is satisfied, selecting a target cell that satisfies the condition among the plurality of candidate target cells.

According to some embodiments, the performing the conditional handover to the target cell, and the starting the timer may include: performing a handover to the target cell without transmitting a measurement report; and starting the timer after performing the conditional handover to the target cell.

According to some embodiments, the configuration information for the conditional handover may include at least one of measurement object information associated with the conditional handover to the target cell, event information, offset information of received power applied to the event, absolute value information of the received power, radio resource information associated with a radio resource to be used by the target cell, random access channel (RACH) configuration information, time information associated with a time during which an RACH resource is valid, and timer value information that determines a handover failure, and the method may further include performing a radio resource control (RRC) reestablishment or performing a fallback to the serving cell if the timer expires.

According to another example of the disclosure, a method of a serving cell in a wireless communication system may include: transmitting a handover request message to a target cell; receiving a handover request acknowledge (ACK) message from the target cell; and transmitting, to a UE, configuration information for a conditional handover to the target cell, and the UE may determine whether at least one of conditions included in the configuration information for the conditional handover is satisfied, and if at least one of the conditions included in the configuration information for the conditional handover is satisfied, may perform the conditional handover to the target cell, and may start a timer included in the configuration information.

According to other embodiments of the disclosure, a UE may include: a transceiver configured to transmit or receive at least one signal; and a controller coupled to the transceiver, and the controller is configured to: receive, from a serving cell, configuration information for a conditional handover to a target cell; determine whether at least one of conditions included in the configuration information for the conditional handover is satisfied; and if at least one of the conditions included in the configuration information for the conditional handover is satisfied, perform the conditional handover to the target cell and start a timer included in the configuration information.

According to other embodiments, a base station may include: a transceiver configured to transmit or receive at least one signal; and a controller coupled to the transceiver, and the controller is configured to: transmit a handover request message to a target cell; receive a handover request ACK message from the target cell; and transmit, to a UE, configuration information for a conditional handover to the target cell, and the UE is configured to determine whether at least one of conditions included in configuration information for the conditional handover is satisfied, to perform the conditional handover to the target cell and to start a timer included in the configuration information if at least one of the conditions included in the configuration information for the conditional handover is satisfied.

According to an embodiment of the disclosure, if a conditional handover is performed in a mobile communication system, and the handover is incompletely performed due to an operational problem thereof, processing by a user equipment (UE) may be defined so as to enable the UE to be reconnected.

According to an embodiment of the disclosure, in the case of a conditional handover in an unlicensed band, a handover is performed by determining whether channel occupancy by another system in a frequency to which the corresponding handover is to be performed is large. Accordingly, whether another system, as opposed to the same communication system, uses a licensed band is determined, and a UE is handed over to a channel that is less used in order to secure the performance of the link of the UE.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

FIG. 2G is a flowchart illustrating a process of providing a measurement report according to an RSSI configuration in LTE, showing a comparison between the disclosure and the conventional technology;

FIG. 2H is a flowchart illustrating a process of providing a measurement report according to a DRS configuration in LTE, showing a comparison between the disclosure and the conventional technology;

FIG. 2J is a flowchart illustrating a process of operating a conditional handover in an unlicensed band according to an embodiment of the disclosure.

DETAILED DESCRIPTION

Figure 1A:
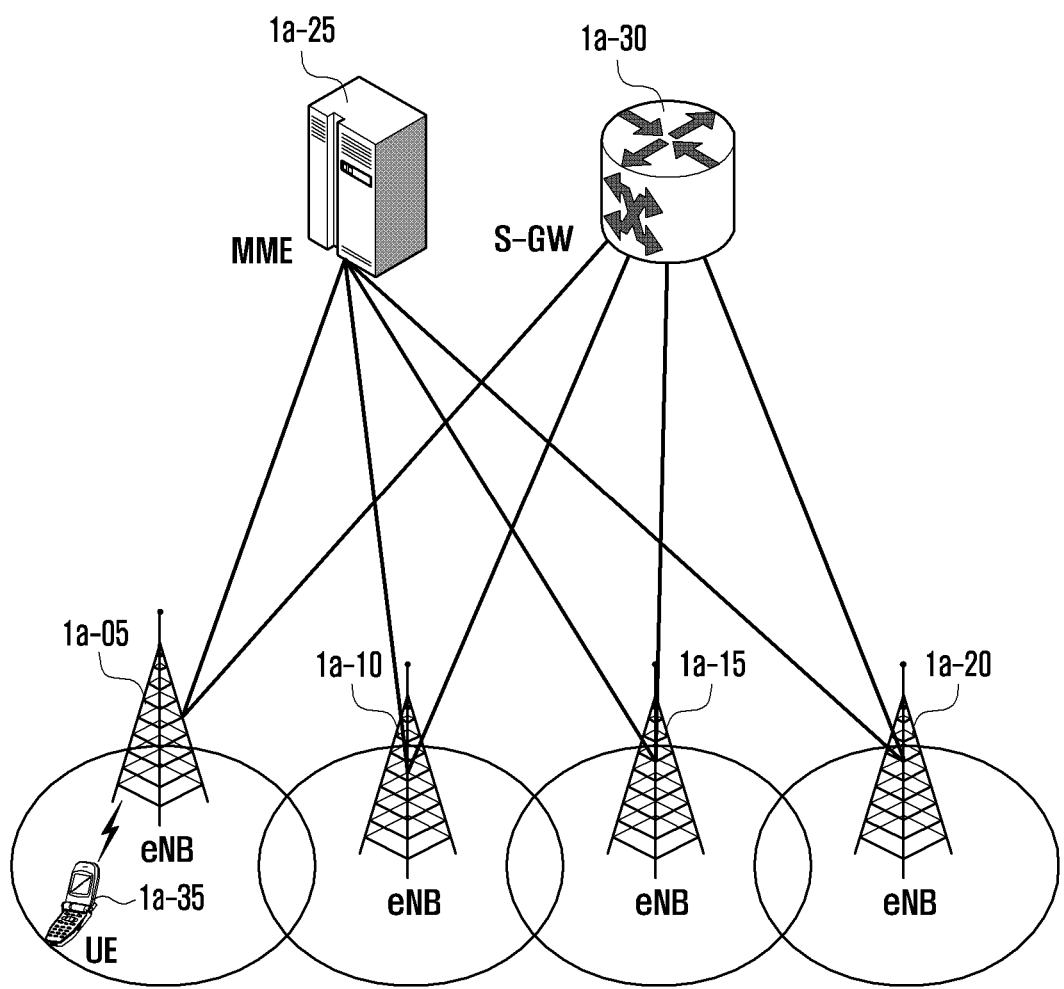
FIG. 1A is a diagram illustrating the structure of an LTE system according to an embodiment of the disclosure.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the $3^{rd}$ generation partnership project long term evolution (3GPP LTE) standards for the convenience of description. However, the disclosure is not limited by these terms and names, and may be applied in the same way to systems that conform other standards.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used. For example, in the following description, the term "terminal" may refer to an MAC entity in each terminal that exists for each of a master cell group (MCG) and a secondary cell group (SCG).

In the following description, the disclosure will be described using terms and names defined in the 3$^{rd}$ generation partnership project long term evolution (3GPP LTE) standards for the convenience of description. However, the disclosure is not limited by these terms and names, and may be applied in the same way to systems that conform other standards.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

In particular, the disclosure may be applied to 3GPP NR (5$^{th}$ generation mobile communication standard). The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. In the disclosure, the term "eNB" may be interchangeably used with the term "gNB" for the convenience of description. That is, a base station described as "eNB" may indicate "gNB". Further, the term "terminal" may refer to cellular phones, NB-IoT devices, sensors, and other wireless communication devices.

A wireless communication system has developed to be a broadband wireless communication system that provides a high-speed and high-quality packet data service, like the communication standards, for example, high speed packet access (HSPA) of 3GPP, long term evolution (LTE) or evolved universal terrestrial radio access (E-UTRA), LTE-advanced (LTE-A), LTE-Pro, high rate packet data (HRPD) of 3GPP2, ultra mobile broadband (UMB), and 802.16e of IEEE, or the like, beyond the voice-based service provided at the initial stage.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). An uplink refers to a radio link via which a user equipment (UE) or a mobile station (MS) transmits data or a control signal to an eNode B or a base station (BS). A downlink refers to a radio link via which a base station transmits data or a control signal to a UE. The multiple access scheme described above may allocate or manage time-frequency resources via which data or control information is carried for each user, not to overlap one another, that is, to have orthogonality, and thereby distinguishing data or control information of each user.

A future communication system after LTE, that is, a 5G communication system, needs to freely apply various requirements from users, service providers, and the like, and thus, a service that satisfies various requirements in parallel needs to be supported. Services considered for the 5G communication system may include an enhanced mobile broadband (eMBB), massive machine type communication (mMTC), ultra reliability low latency communication (URLLC), and the like.

According to some embodiments, eMBB aims at providing a data transmission rate more enhanced than a data transmission rate supported by legacy LTE, LTE-A, or LTE-pro. For example, in the 5G communication system, eMBB needs to provide a maximum of 20 Gbps peak data rate in a downlink, and a maximum of 10 Gbps peak data rate in an uplink, from the perspective of a single base station. In addition, the 5G communication system needs to provide an enhanced user perceived data rate of a UE, in parallel with providing a peak data rate. In order to satisfy the requirements, there is a desire for improvement of various transmission or reception technologies including an advanced multi input multi output (MIMO) transmission technology in the 5G communication system. In addition, legacy LTE transmits a signal in a 2 GHz band using a maximum of 20 MHz transmission bandwidth. However, the 5G communication system uses a frequency bandwidth wider than 20 MHz in a frequency band ranging 3 to 6 GHz or in a frequency band greater than or equal to 6 GHz, and thus, the data transmission speed required by the 5G communication system may be satisfied.

In addition, in the 5G communication system, using mMTC is considered in order to support application services such as Internet of Thing (IoT). mMTC requires supporting access of a large number of Ues within a cell, improvement of the coverage area of a UE, enhanced battery life expectancy, reduction of cost of a UE, and the like, in order to effectively provide IoT. IoT provides a communication function via attachment to various sensors and various devices and thus, a large number of Ues needs to be supported within a cell (e.g., 1,000,000 Ues/km2). In addition, a UE that supports mMTC has a high probability of being located in a shadow area that a cell cannot cover, such as the basement of a building, in terms of the feature of the service, and may require a coverage area wider than those of other services of the 5G communication system. The UE that supports mMTC needs to be manufactured as an inexpensive UE, and it is inconvenient to frequently change the battery of the UE. Accordingly, a long battery life time such as 10 to 15 years may be required.

URLLC is a mission-critical cellular-based wireless communication service. A remote control service for a robot or machinery, an industrial automation service, an unmanned aerial vehicle service, a remote heath care service, an emergency alert service, and the like may be considered. Therefore, communication provided by URLLC may need to provide significantly low latency (ultra low latency) and significantly high reliability (ultra reliability). For example, the service that supports URLLC needs to satisfy an air interface latency less than 0.5 milliseconds, and at the same time, needs to satisfy a packet error rate less than or equal to $10^{-5}$. Therefore, for the service that supports URLLC, the 5G system needs to provide a transmit time interval (TTI) smaller than those of other services, and at the same time, is required to allocate a wide resource in a frequency band in order to secure reliability of a communication link.

The three services in 5G, that is, eMBB, URLLC, and mMTC may be multiplexed and transmitted in a single system. In this instance, in order to satisfy different requirements of the services, transmission or reception schemes and transmission or reception parameters different among the services may be used. However, above-mentioned mMTC, URLLC, and eMBB are examples of different types of services, and a service type to which the disclosure is to be applied is not limited to the mentioned examples.

In addition, although the embodiments of the disclosure will be described by taking LTE, LTE-A, LTE-Pro or 5G (or NR, next generation mobile communication) system as an example, the embodiments of the disclosure may be applicable to other communication systems having similar technical backgrounds or similar types of channels. In addition, the embodiments of the disclosure may be modified by those skilled in the art without departing from the scope of the disclosure, and may be applied to other communication systems.

FIG. 1A is a diagram illustrating the structure of an LTE system according to an embodiment of the disclosure.

Referring to FIG. 1A, as illustrated in the drawings, a radio access network of an LTE system may include a next generation base station (an Evolved Node B (ENB), a Node B, or a base station) 1a-05, 1a-10, 1a-15, and 1a-20, a mobility management entity (MME) 1a-25, and a serving-gateway (S-GW) 1a-30. A user equipment (UE) (or a terminal) 1a-35 may access an external network via the ENB 1a-05 to 1a-20 and the S-GW 1a-30.

In FIG. 1A, the ENB 1a-05 to 1a-20 may correspond to a legacy node B in a UMTS system. The ENB is connected with the UE 1a-35 via a wireless channel, and performs a more complicated role than the legacy node B. In the LTE system, real-time services, such as a voice over IP (VoIP) based on an Internet protocol, and all user traffic may be provided via a shared channel. Accordingly, there is a desire for a device that performs scheduling by collecting state information, such as the buffer states, available transmission power states, channel states, and the like associated with Ues, and the ENB 1a-05 to 1a-20 may be in charge of the same. A single ENB may generally control a plurality of cells. For example, in order to implement a transmission rate of 100 Mbps, the LTE system uses an orthogonal frequency division multiplexing (OFDM) as a radio access technology in a bandwidth of 20 MHz. Further, the ENB may apply an adaptive modulation and coding (AMC) scheme which determines a modulation scheme and a channel coding rate according to the channel state of a UE. The S-GW 1a-30 is a device for providing a data bearer, and produces or removes a data bearer according to the control by the MME 1a-25. The MME is a device that is in charge of various control functions in addition to a mobility management function associated with a UE, and may be connected to a plurality of base stations.

Figure 1B:
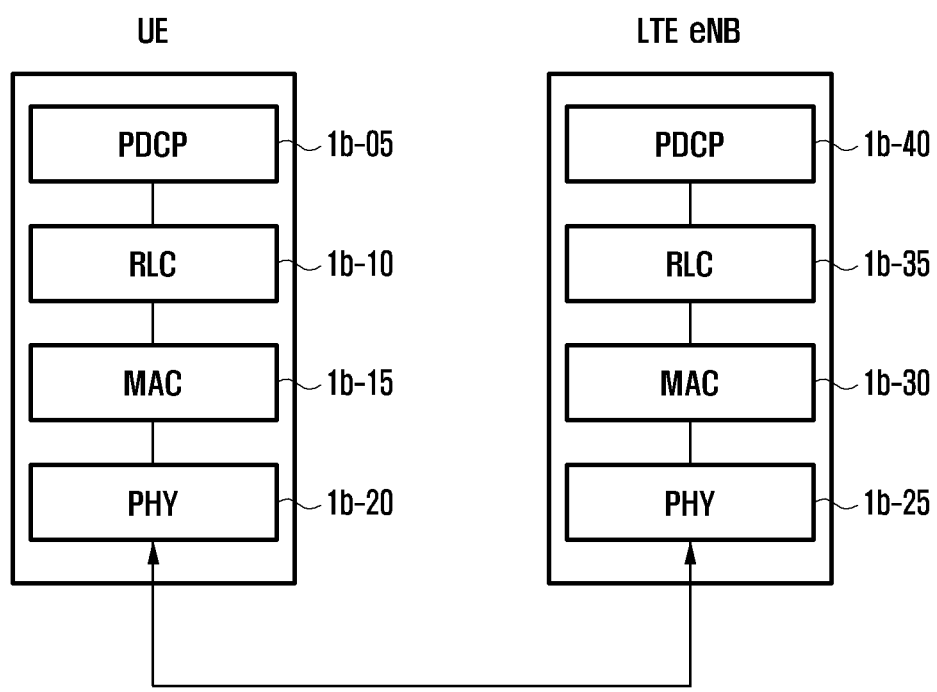
FIG. 1B is a diagram illustrating the structure of a radio protocol of an LTE system according to an embodiment of the disclosure.

FIG. 1B is a diagram illustrating the structure of a radio protocol of an LTE system according to an embodiment of the disclosure.

Referring to FIG. 1B, the radio protocol of the LTE system may include a packet data convergence protocol (PDCP) 1b-05 and 1b-40, a radio link control (RLC) 1b-10 and 1b-35, a medium access control (MAC) 1b-15 and 1b-30 for each of a UE and an eNB. A PDCP is in charge of IP header compression/decompression, or the like. The main function of the PDCP may be summarized as follows. However, the function is not limited to the following example.

header compression and decompression (header compression and decompression: ROHC only)

transfer of user data sequential delivery (in-sequence delivery of upper layer PDUs at PDCP re-establishment procedure for RLC AM)

reordering (for split bearers in DC (only support for RLC AM): PDCP PDU routing for transmission and PDCP PDU reordering for reception)

duplicate detection (duplicate detection of lower layer SDUs at PDCP re-establishment procedure for RLC AM)

retransmission (retransmission of PDCP SDUs at handover and, for split bearers in DC, of PDCP PDUs at PDCP data-recovery procedure, for RLC AM)

ciphering and deciphering timer-based SDU discard (timer-based SDU discard in uplink)

According to some embodiments, a radio link control (RLC) 1b-10 and 1b-35 may reconfigure a PDCP packet data unit (PDU) to have an appropriate size and may perform an ARQ operation or the like. The main function of the RLC may be summarized as follows. However, the function is not limited to the following example.

transfer of data (transfer of upper layer PDUs)

ARQ (error correction through ARQ (only for AM data transfer))

concatenation, segmentation and reassembly (concatenation, segmentation and reassembly of RLC SDUs (only for UM and AM data transfer))

re-segmentation (re-segmentation of RLC data PDUs (only for AM data transfer))

reordering (reordering of RLC data PDUs (only for UM and AM data transfer)

duplicate detection (duplicate detection (only for UM and AM data transfer))

error detection (protocol error detection (only for AM data transfer))

RLC SDU discard (RLC SDU discard (only for UM and AM data transfer))

RLC re-establishment

According to some embodiments, the MAC 1*b*-15 and 1*b*-30 is connected to various RLC layer devices configured for one UE, and multiplexes RLC PDUs to a MAC PDU and demultiplexes RLC PDUs from a MAC PDU. The main function of the MAC may be summarized as follows. However, the function is not limited to the following example.

mapping (mapping between logical channels and transport channels)

multiplexing and demultiplexing (multiplexing/demultiplexing of MAC SDUs belonging to one or different logical channels into/from transport blocks (TB) delivered to/from the physical layer on transport channels)

scheduling information reporting

HARQ (error correcting through HARQ)

priority handling between logical channels (priority handling between logical channels of one UE)

priority handling between UEs (priority handling between UEs by means of dynamic scheduling)

MBMS service identification transport format selection padding

According to some embodiments, the PHY layer 1*b*-20 and 1*b*-25 performs an operation of channel-coding and modulating higher layer data so as to produce an OFDM symbol and transmitting the OFDM symbol via a wireless channel, or performs an operation of demodulating and channel-decoding an OFDM symbol received via the wireless channel and transmitting the demodulated and channel-decoded OFDM symbol to a higher layer. However, this is not limited to the following example.

Figure 1C:
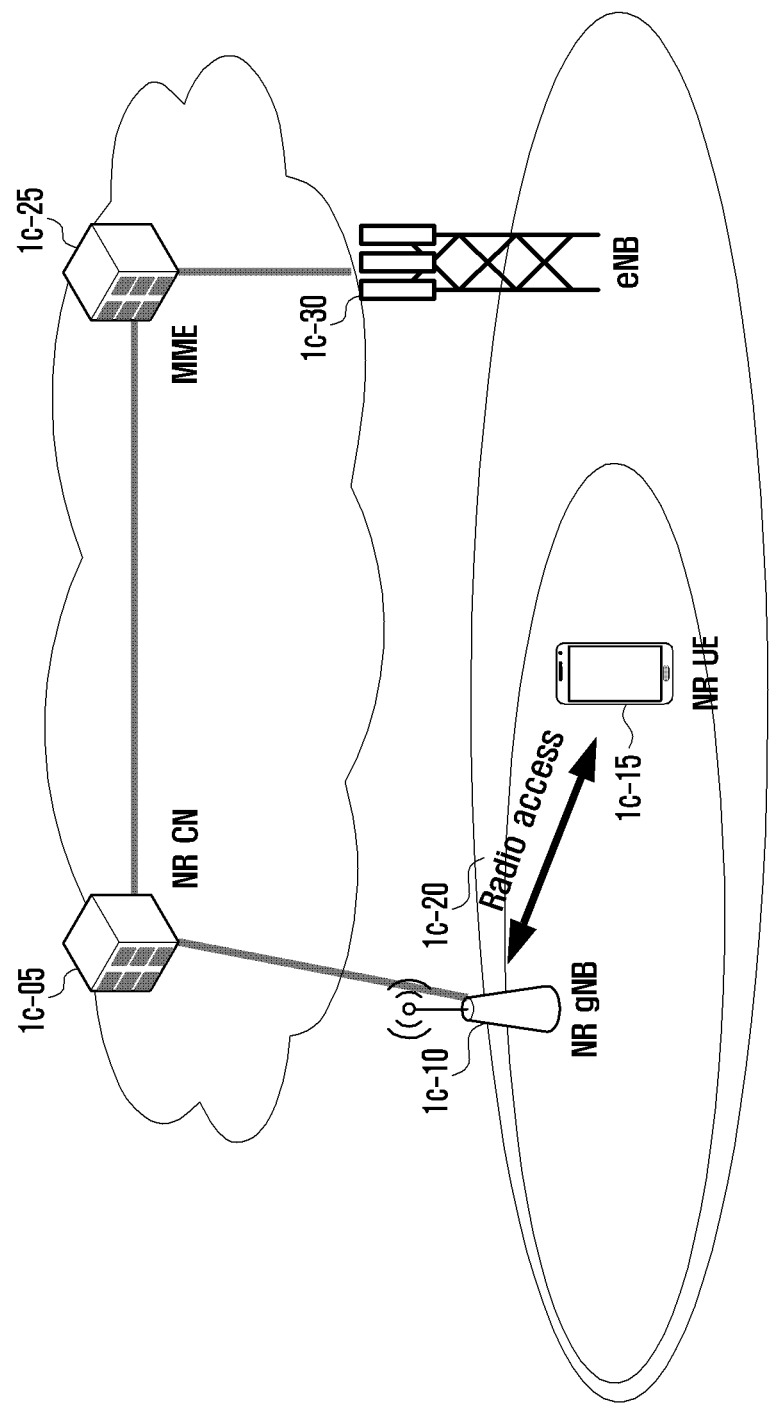
FIG. 1C is a diagram illustrating the structure of a next generation mobile communication system according to an embodiment of the disclosure.

FIG. 1C is a diagram illustrating the structure of a next generation mobile communication system according to an embodiment of the disclosure.

Referring to FIG. 1C, a radio access network of a next generation mobile communication system (hereinafter, NR or 2*g*) may include a next generation base station (a new radio node B (hereinafter, an NR gNB or an NR base station)) 1*c*-10 and a next generation radio core network (new radio core network (NR CN)) 1*c*-05. A next generation radio user equipment (new radio user equipment (NR UE) (or a UE)) 1*c*-15 may access an external network via an NR gNB 1*c*-10 and an NR CN 1*c*-05.

In FIG. 1C, the NR gNB 1*c*-10 may correspond to an evolved nodeB (eNB) of a legacy LTE system. The NR gNB may be connected to the NR UE 1*c*-15 via a wireless channel, and may provide a better service than a service from a legacy Node B. In the next generation mobile communication system, all user traffic is serviced via a shared channel. Accordingly, there is a desire for a device that performs scheduling by collecting state information such as the buffer states, available transmission power states, channel states, and the like in association with UEs, and the NR NB 1*c*-10 may be in charge of the same. A single NR gNB may generally control a plurality of cells. In order to implement ultra-high speed data transmission when compared to legacy LTE, a bandwidth greater than or equal to the current maximum bandwidth may be applied in the next generation mobile communication system. In addition, an orthogonal frequency division multiplexing (OFDM) may be used as a radio access technology and a beamforming technology may be additionally used.

In addition, according to some embodiments, the NR gNB may apply an adaptive modulation & coding (AMC) scheme which determines a modulation scheme and a channel coding rate based on the channel state of a UE. The NR CN 1*c*-05 may perform a function of supporting mobility, configuring a bearer, configuration a QoS, and the like. The NR CN 1*c*-05 is a device that is in charge of various control functions in addition to a mobility management function associated with a UE, and may be connected to a plurality of base stations. In addition, the next generation mobile communication system may interoperate with a legacy LTE system, and an NR CN may be connected to an MME 1*c*-25 via a network interface. The MME may be connected to an eNB 1*c*-30 which is a legacy base station.

Figure 1D:
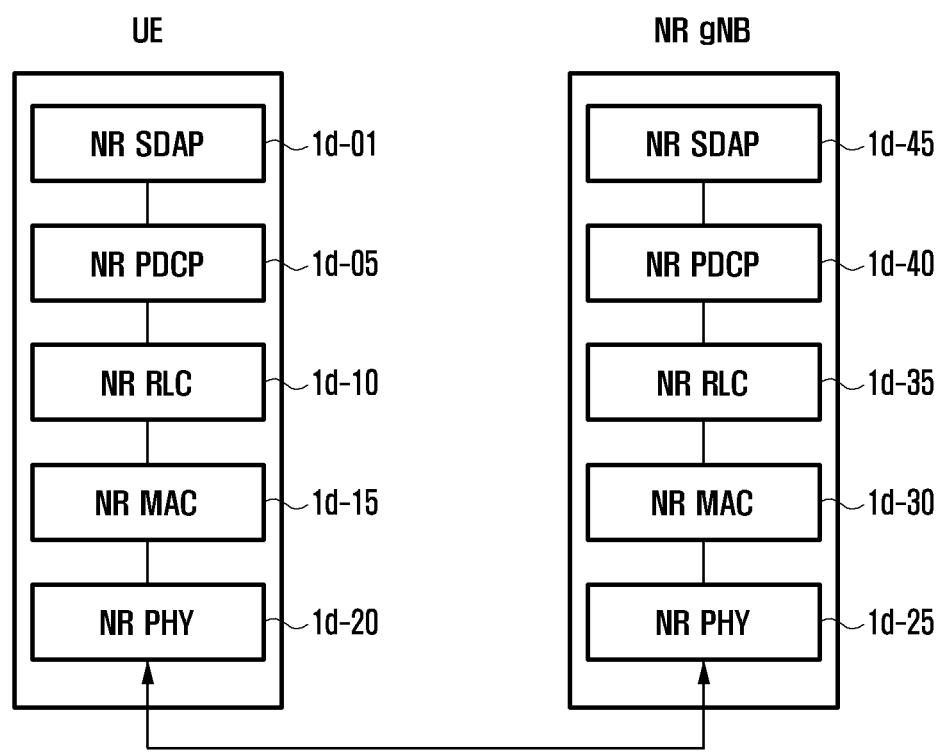
FIG. 1D is a diagram illustrating the structure of a radio protocol of a next generation mobile communication system according to an embodiment of the disclosure.

FIG. 1D is a diagram illustrating the structure of a radio protocol of a next generation mobile communication system according to an embodiment of the disclosure.

Referring to FIG. 1D, the radio protocol of the next generation mobile communication system may include an NR service data adaptation protocol (SDAP) 1*d*-01 and 1*d*-45, an NR PDCP 1*d*-05 and 1*d*-40, an NR RLC 1*d*-10 and 1*d*-35, and an NR MAC 1*d*-15 and 1*d*-30 for each of a UE and an NR gNB.

According to some embodiments, the main functions of the NR SDAP 1*d*-01 and 1*d*-45 may include some of the following functions. However, this is not limited to the following example.

transfer of user data (transfer or user plane data)

mapping between a QoS flow and a data bearer (DRB) for both downlink and uplink marking a QoS flow ID in both DL and UL packets reflective QoS flow to DRB mapping for uplink SDAP PDUs In association with an SDAP layer device, whether to use the header of the SDAP layer device or whether to use the function of the SDAP layer device may be configured for the UE via a radio resource control (RRC) message for each PDCP layer device, for each bearer, or for each logical channel. If the SDAP header is configured, the UE may provide an indication using a non-access stratum (NAS) reflective quality of service (QoS) configuration one-bit indicator and an access stratum (AS) reflective QoS configuration one-bit indicator of the SDAP header so that the UE updates or reconfigures mapping information between a QoS flow and a data bearer in an uplink and a downlink. According to some embodiments, the SDAP header may include QoS flow ID information indicating a QoS. According to some embodiments, the QoS information may be may be used as data processing priority, scheduling information, or the like for supporting a smooth service.

According to some embodiments, the main functions of the NR PDCP 1*d*-05 and 1*d*-40 may include some of the following functions. However, this is not limited to the following example.

header compression and decompression (Header compression and decompression: ROHC only):

transfer of user data sequential delivery (in-sequence delivery of upper layer PDUs)

non-sequential delivery (out-of-sequence delivery of upper layer PDUs)

reordering (PDCP PDU reordering for reception)

duplicate detection (duplicate detection of lower layer SDUs)

retransmission (retransmission of PDCP SDUs)

ciphering and deciphering timer-based SDU discard (timer-based SDU discard in uplink)

The mentioned reordering function of the NR PDCP device is a function of sequentially reordering PDCP PDUs received from a lower layer according to a PDCP sequence number (SN). The reordering function of the NR PDCP device may include a function of transferring sequentially reordered data to a higher layer, a function of immediately transferring data irrespective of a sequence, a function of recording lost PDCP PDUs after sequential recording, a function of reporting the states of lost PDCP PDUs to a transmission side, and a function of requesting retransmission of lost PDCP PDUs.

According to some embodiments, the main functions of the NR RLC 1d-10 and 1d-35 may include some of the following functions. However, this is not limited to the following example.

transfer of data (transfer of upper layer PDUs)
sequential delivery (in-sequence delivery of upper layer PDUs)
non-sequential delivery (out-of-sequence delivery of upper layer PDUs)
ARQ (error correcting via ARQ)
concatenation, segmentation, and reassembly (concatenation, segmentation and reassembly of RLC SDUs)
re-segmentation (re-segmentation of RLC data PDUs)
reordering (reordering of RLC data PDUs)
duplicate detection
error detection (protocol error detection)
RLC SDU discard
RLC re-establishment In the above-description, the in-sequence delivery function of the NR RLC device is a function of sequentially transferring RLC SDUs, received from a lower layer, to a higher layer If a single original RLC SDU is divided into multiple RLC SDUs and the multiple RLC SUDs are received, the in-sequence delivery function of the NR RLC device may include a function of re-assembling the RLC SUDs and transferring the same.

The in-sequence delivery function of the NR RLC device may include a function of reordering received RLC PDUs according to an RLC sequence number (SN) or a PDCP sequence number (SN), a function of recording lost RLC PDUs after sequential reordering, a function of reporting the states of the lost RLC PDUs to a transmission side, and a function of requesting retransmission of the lost RLC PDUs.

The in-sequence delivery function of the NR RLC device may include a function of sequentially transferring only RLC SDUs before a lost RLC SDU, to a higher layer, if a lost RLC SDU exists.

The in-sequence delivery function of the NR RLC device may include a function of sequentially transferring all RLC SDUs, received before a predetermined timer starts, to a higher layer even though a lost RLC SDU exists, if the predetermined timer expires.

The in-sequence delivery function of the NR RLC device may include a function of sequentially transferring all RLC SDUs, received up to the present, to a higher layer even though a lost RLC SDU exists, if a predetermined timer expires.

The NR RLC device may process RLC PDUs in order of reception, irrespective of a sequence number (out-of-sequence delivery), and transmit the same to the NR PDCP device.

In the case in which the NR RLC device receives a segment, the NR RLC device receives segments which are stored in a buffer or which are to be received in the future, and reconfigures the segments as a single intact RLC PDU, and transmits the same to the NR PDCP device.

The NR RLC layer may not include a concatenation function. In addition, the concatenation function may be performed in the NR MAC layer or may be replaced with a multiplexing function in the NR MAC layer.

The above-mentioned out-of-sequence delivery function of the NR RLC device is a function of transferring RLC SDUs, received from a lower layer, to a higher layer irrespective of a sequence. In the case in which a single original RLC SDU is divided into multiple RLC SDUs and the multiple RLC SDUs are received, the out-of-sequence delivery function of the NR RLC device may include a function of re-assembling the RLC SDUs and transmitting the same. The out-of-sequence delivery function of the NR RLC device may include a function of storing the RLC SN or PDCP SN of received RLC PDUs, sequentially ordering the same, and recording lost RLC PDUs.

Figure 1E:
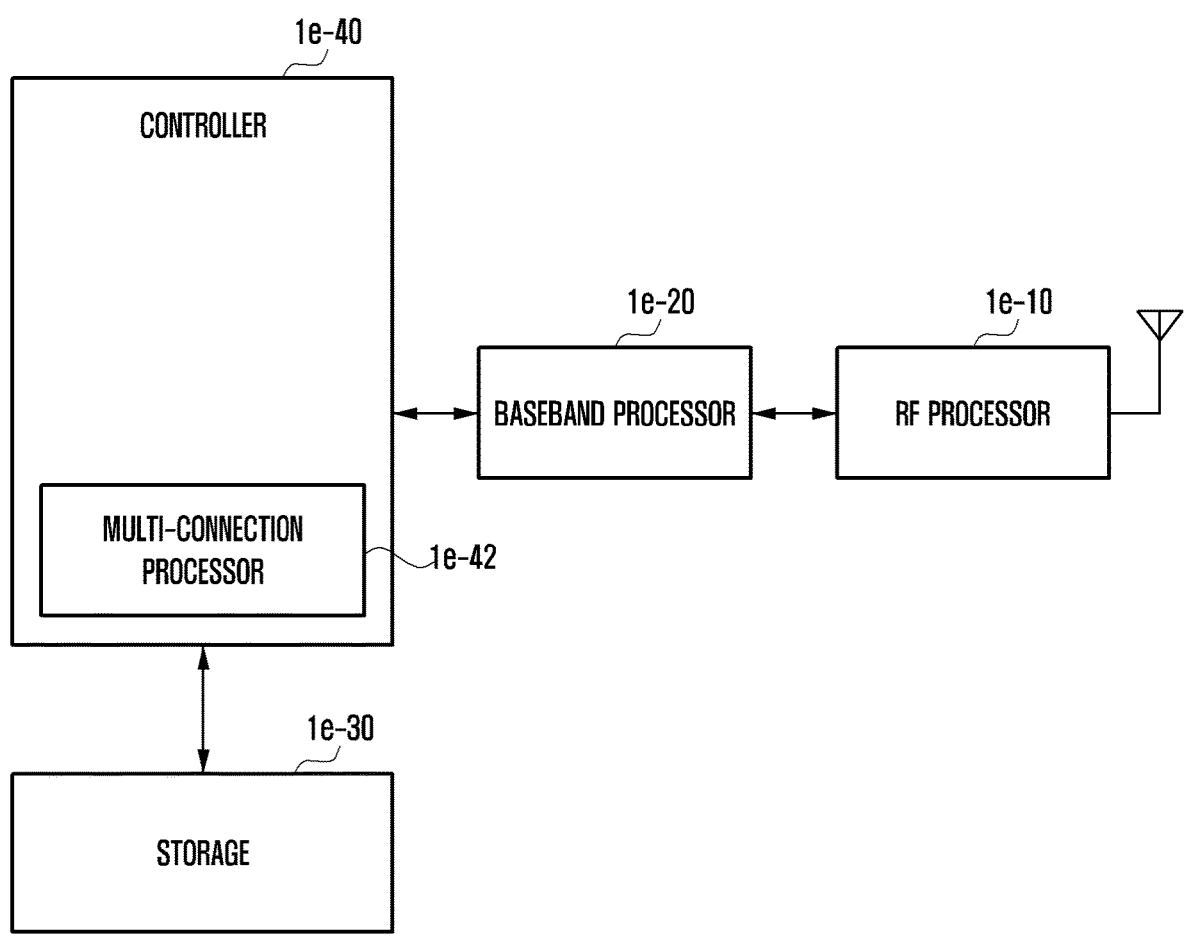
FIG. 1E is a block diagram illustrating the internal structure of a user equipment (UE) according to an embodiment of the disclosure.

According to some embodiments, the NR MAC 1d-15 and 1d-30 may be connected to multiple NR RLC layer devices configured for a single UE, and the main functions of the NR MAC may include some of the following functions. However, this is not limited to the following example.

mapping (mapping between logical channels and transport channels)
multiplexing and demultiplexing (multiplexing/demultiplexing of MAC SDUs)
scheduling information reporting
HARQ (error correcting through HARQ)
priority handling between logical channels (priority handling between logical channels of one UE)
priority handling between UEs (priority handling between UEs by means of dynamic scheduling)
MBMS service identification
transport format selection
padding The NR PHY layer 1d-20 and 1d-25 may perform channel-coding and modulating of higher layer data so as to produce an OFDM symbol and may transmit the OFDM symbol via a wireless channel, or may perform demodulating and channel-decoding of an OFDM symbol, received via a wireless channel, and may transmit the demodulated and channel-decoded OFDM symbol to a higher layer FIG. 1E is a block diagram illustrating the internal structure of a UE according to an embodiment of the disclosure.

Referring to FIG. 1E, the UE may include a radio frequency (RF) processor 1e-10, a baseband processor 1e-20, a storage 1e-30, and a controller 1e-40. As a matter of course, the UE is not limited to the example, and may include fewer or more components than the components of FIG. 1E.

The RF processor 1e-10 may perform a function, such as band conversion and amplification of a signal, in order to perform signal transmission or reception via a wireless channel. That is, the RF processor 1e-10 up-converts a baseband signal provided from the baseband processor 1e-20 into an RF band signal, transmits the RF band signal via an antenna, and down-converts an RF band signal received via an antenna into a baseband signal. For example, the RF processor 1e-10 may include a transmission filter, a reception filter, an amplifier, a mixer, an oscillator, a digital-to-analog converter (DAC), an analog-to-digital converter (ADC), and the like. However, this is not limited to the above-described example. Although FIG. 1E illustrates only a single antenna, the UE may have a plurality of antennas. In addition, the RF processor 1e-10 may include a plurality of RF chains. Moreover, the RF processor 1e-10 may perform beamforming. For the beamforming, the RF processor 1e-10 may control the phase and the size of each signal transmitted or received via a plurality of antennas or antenna elements. In addition, the RF processor 1e-10 may perform multi-input multi-output (MIMO), and may receive multiple layers when performing an MIMO operation.

The baseband processor 1e-20 may execute a function of converting between a baseband signal and a bitstream according to the physical layer standard of a system. For example, in the case of data transmission, the baseband processor 1e-20 encodes and modulates a transmission bitstream, so as to produce complex symbols. In addition, in the case of data reception, the baseband processor 1e-20, restores a reception bitstream by demodulating and decoding a baseband signal provided from the RF processor 1e-10. For example, according to an orthogonal frequency division multiplexing (OFDM) scheme, in the case of data transmission, the baseband processor 1e-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. Further, in the case of data reception, the baseband processor 1e-20 divides a baseband signal provided from the RF processor 1e-10 in units of OFDM symbols, reconstructs signals mapped to subcarriers via fast Fourier transform (FFT), and then reconstructs a received bitstream via demodulation and decoding.

The baseband processor 1e-20 and the RF processor 1e-10 transmit and receive signals as described above. The baseband processor 1e-20 and the RF processor 1e-10 may be referred to as a transmitter, a receiver, a transceiver, or a communication unit. Furthermore, at least one of the baseband processor 1e-20 and the RF processor 1e-10 may include a plurality of communication modules in order to support a plurality of different radio access technologies. In addition, at least one of the baseband processor 1e-20 and the RF processor 1e-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band. The UE may perform signal transmission or reception with a base station using the baseband processor 1e-20 and the RF processor 1e-10, and a signal may include control information and data.

The storage 1e-30 may store data, such as a basic program for operating a UE, an application program, configuration information, and the like. Particularly, the storage 1e-30 may store information related to a second access node that performs wireless communication using a second radio access technology. The storage 1e-30 may provide data stored therein in response to a request from the controller 1e-40. The storage 1e-30 may be configured as a storage medium such as ROM, RAM, hard disk, CD-ROM, DVD, and the like, or a combination of storage media. In addition, the storage 1e-30 may include a plurality of pieces of memories.

The controller 1e-40 may control the overall operation of a UE. For example, the controller 1e-40 may perform transmission or reception of a signal via the baseband processor 1e-20 and the RF processor 1e-10. Further, the controller 1e-40 records data in the storage 1e-40 and reads the recorded data. To this end, the controller 1e-40 may include at least one processor. For example, the controller 1e-40 may include a communication processor (CP) that performs control for communication, and an application processor (AP) that controls a higher layer such as an application program. In addition, at least one configuration included in the UE may be implemented as a single chip.

Figure 1F:
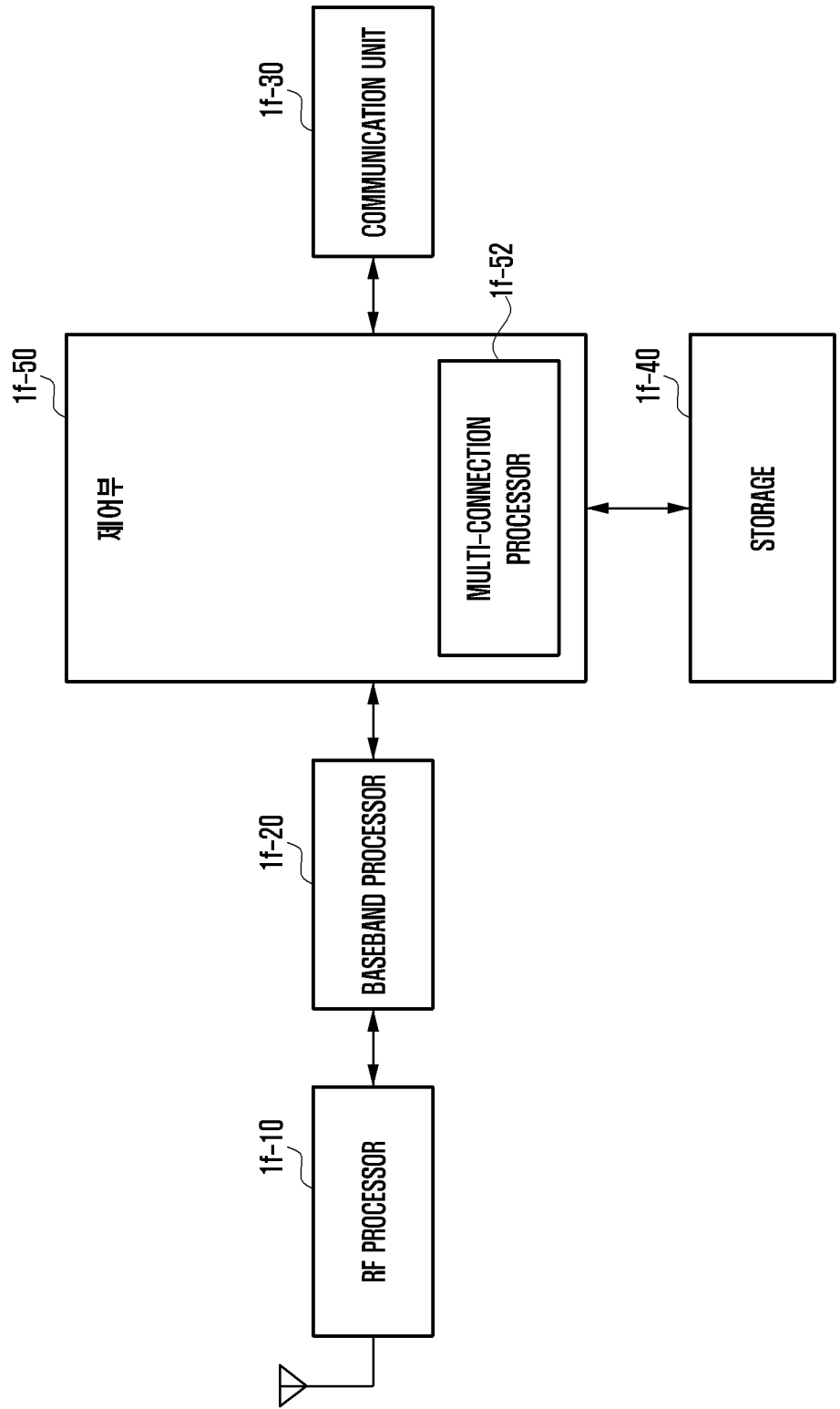
FIG. 1F is a block diagram illustrating the configuration of an NR base station according to an embodiment of the disclosure.

FIG. 1F is a block diagram illustrating the configuration of an NR base station according to an embodiment of the disclosure.

Referring to FIG. 1F, the base station may include an RF processor 1f-10, a baseband processor 1f-20, a backhaul communication unit 1f-30, a storage unit 1f-40, and a controller 1f-50. As a matter of course, the base station is not limited to the example, and may include fewer or more components than the components of FIG. 1F.

The RF processor 1f-10 may perform a function, such as band conversion and amplification of a signal, in order to perform signal transmission or reception via a wireless channel. That is, the RF processor 1f-10 up-converts a baseband signal provided from the baseband processor 1f-20 into an RF band signal so as to transmit the RF band signal via an antenna, and down-converts an RF band signal received via an antenna into a baseband signal. For example, the RF processor 1f-10 may include a transmission filter, a reception filter, an amplifier, a mixer, an oscillator, a DAC, an ADC, and the like. Although FIG. 1f illustrates a single antenna, the RF processor 1f-10 may include a plurality of antennas. In addition, the RF processor 1f-10 may include a plurality of RF chains. Moreover, the RF processor 1f-10 may perform beamforming. For the beamforming, the RF processor 1f-10 may control the phase and the size of each signal transmitted or received via a plurality of antennas or antenna elements. The RF processor may perform a downlink MIMO operation by transmitting one or more layers.

The baseband processor 1f-20 may perform a function of conversion between a baseband signal and a bitstream according to the physical layer standard of a first radio access technology. For example, in the case of data transmission, the baseband processor 1f-20 encodes and modulates a transmission bitstream, so as to produce complex symbols. In addition, in the case of data reception, the baseband processor 1f-20, may restore a reception bitstream by demodulating and decoding a baseband signal provided from the RF processor 1f-10. For example, according to the OFDM scheme, in the case of data transmission, the baseband processor 1f-20 may produce complex symbols by encoding and modulating a transmission bitstream, may map the complex symbols to subcarriers, and then may configure OFDM symbols via an IFFT operation and CP insertion. Further, in the case of data reception, the baseband processor 1f-20 may divide a baseband signal provided from the RF processor 1f-10 in units of OFDM symbols, may reconstruct signals mapped to the subcarriers via a fast Fourier transform (FFT) operation, and then may reconstruct a received bitstream via demodulation and decoding. The baseband processor 1f-20 and the RF processor 1f-10 may transmit and receive signals as described above. Accordingly, the baseband processor 1f-20 and the RF processor 1f-10 may be referred to as a transmitter, a receiver, a transceiver, a communication unit, or a wireless communication unit. The base station may perform signal transmission or reception with a UE using the baseband processor 1f-20 and the RF processor 1f-10, and the signal may include control information and data.

The backhaul communication unit 1f-30 provides an interface for performing communication with other nodes in a network. That is, the backhaul communication unit 1f-30 may convert, into a physical signal, a bit stream transmitted from a main base station to another node, for example, a secondary base station, a core network, and the like, and may convert a physical signal received from another node into a bit stream. The backhaul communication unit 1f-30 may be included in a communication unit.

The storage 1*f*-40 may store data, such as a basic program for operating a base station, an application program, configuration information, and the like. The storage 1*f*-40 may store information associated with a bearer allocated to a connected UE, a measurement result reported from a connected UE, and the like. In addition, the storage 1*f*-40 may store information which is a criterion for determining whether to provide or suspend multiple connections to a UE. The storage 1*f*-40 may provide data stored therein in response to a request from the controller 1*f*-50. The storage 1*f*-40 may be configured as a storage medium such as ROM, RAM, hard disk, CD-ROM, DVD, and the like, or a combination of storage media. In addition, the storage 1*f*-40 may include a plurality of pieces of memories. According to some embodiments, the storage 1*f*-40 may store a program for implementing a buffer state reporting method according to the disclosure.

The controller 1*f*-50 may control the overall operation of the base station. For example, the controller 1*f*-50 may perform transmission or reception of a signal via the baseband processor 1*f*-20 and the RF processor 1*f*-10, or via the backhaul communication unit 1*f*-30. Further, the controller 1*f*-50 records data in the storage 1*f*-40 and reads the recorded data. To this end, the controller 1*f*-50 may include at least one processor. In addition, at least one configuration included in the base station may be implemented as a single chip.

Figure 1G:
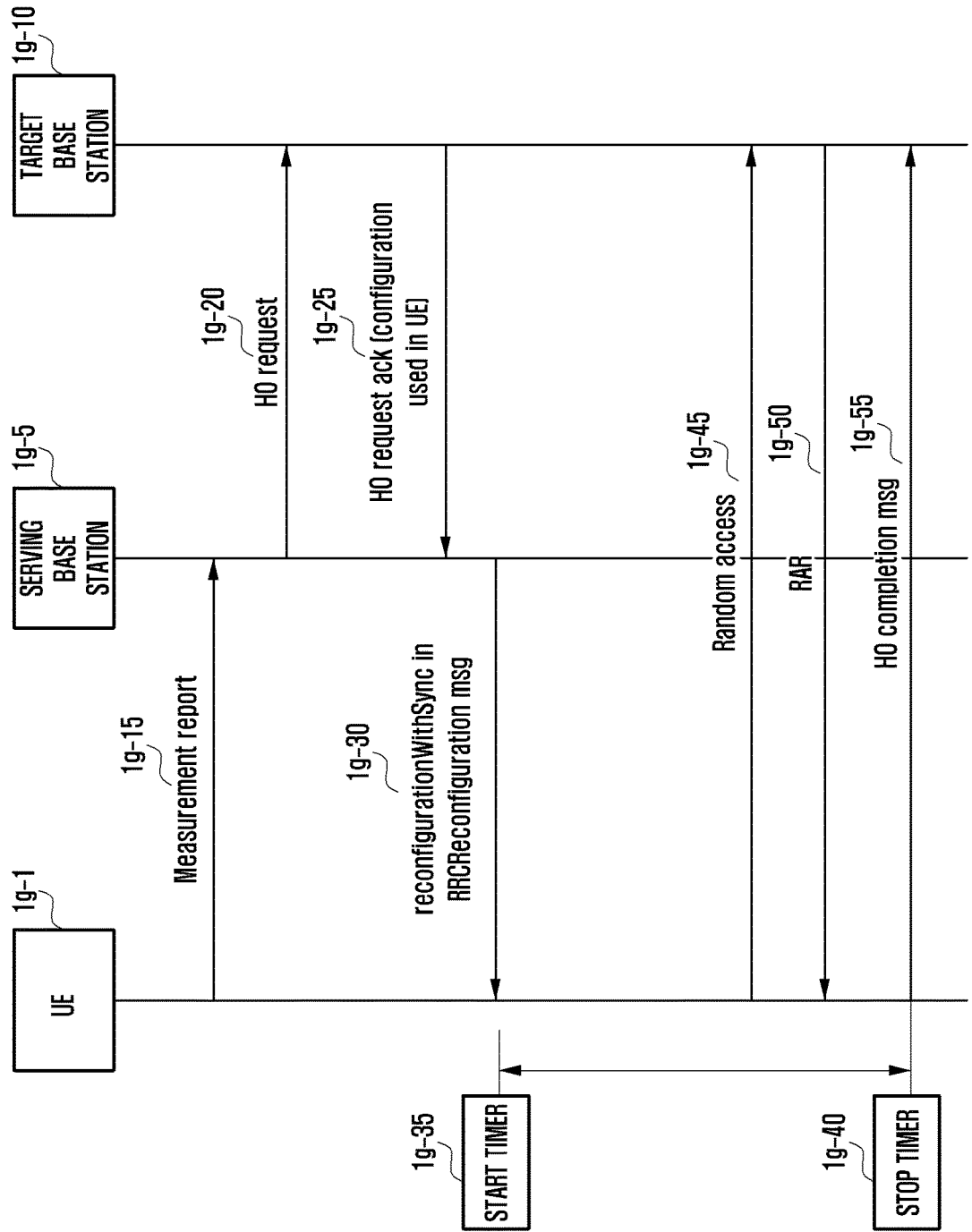
FIG. 1G is a diagram illustrating the operation of a handover timer in LTE according to an embodiment of the disclosure.

FIG. 1G is a diagram illustrating the operation of a handover timer in LTE according to an embodiment of the disclosure.

Referring to FIG. 1G, a UE 1*g*-1 is connected to a serving base station 1*g*-5 including a serving cell. The UE 1*g*-1 may transfer a measurement report to the serving base station 1*g*-5 according to a previously configured measurement configuration in operation 1*g*-15. The serving base station 1*g*-5 may use measurement result values, which were received from the UE 1*g*-1, and may determine to perform a handover to the cell of a target base station 1*g*-10. The serving base station 1*g*-5 may transfer a handover request message to the target base station 1*g*-10 via an X2 or Xn in operation 1*g*-20. In response to the handover request message, the target base station 1*g*-10 may transfer radio and resource information, which is capable of being configured for the UE 1*g*-1, via a handover request ack message in operation 1*g*-25. The serving base station 1*g*-5 that receives the radio and resource information may include the information in mobility control info of an RRC connection reconfiguration message, and may transfer the same to the UE 1*g*-1 in operation 1*g*-30. The information may be produced from the target base station 1*g*-10, and may be information including a configuration added by the serving base station 1*g*-5 as occasion arises. A timer value for identifying a handover failure may be included in the message and may be transferred. If the UE 1*g*-1 receives the RRC connection reconfiguration message, the UE 1*g*-1 may operate the timer for identifying a handover failure in operation 1*g*-35. The UE 1*g*-1 performs a handover to the target base station 1*g*-10. While performing the handover, the UE 1*g*-1 may perform random access to the target base station 1*g*-10 in operation 1*g*-45. If the random access is successfully performed, the UE 1*g*-1 may receive a radon access response (RAR) from the target base station 1*g*-10 in operation 1*g*-50. In this instance, the UE 1*g*-1 may receive an upstream transmission grant from the target base station 1*g*-10. Using the grant resource, the UE 1*g*-1 may transmit a handover complete message to the target base station 1*g*-10 in operation 1*g*-55. If the handover complete message is transmitted before the timer, which began in operation 1*g*-35, expires, the UE 1*g*-1 may stop the timer. If the timer, which has begun, expires before a handover complete message is transmitted, the UE 1*g*-1 may be changed to an idle state.

Figure 1H:
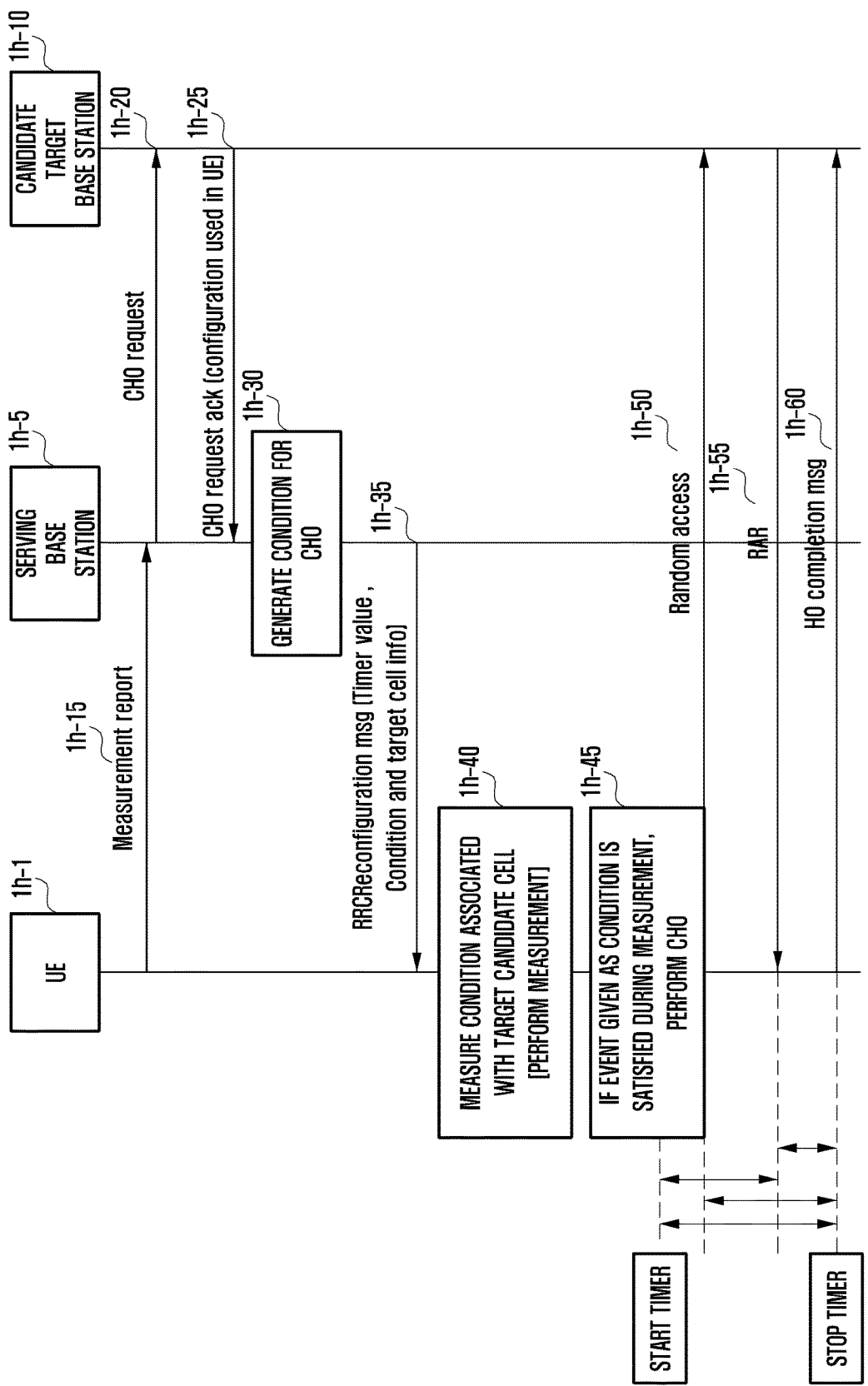
FIG. 1H is a diagram illustrating the case of applying a timer to a conditional handover according to an embodiment of the disclosure.

FIG. 1H is a diagram illustrating the case of applying a timer to a conditional handover according to an embodiment of the disclosure.

Referring to FIG. 1H, a UE 1*h*-1 may be connected to a serving base station 1*h*-5. The UE 1*h*-1 may transfer a measurement result to the serving base station 1*h*-5 according to a previously configured measurement configuration in operation 1*h*-15. The serving base station 1*h*-5 may transmit a conditional handover request message to a candidate target base station 1*h*-10 which is regarded as a target base station in operation 1*h*-20. The conditional handover request message includes currently established radio bearer information of the corresponding UE 1*h*-1, currently configured resource information, and the like, and may be transferred to the candidate target base station 1*h*-10. The candidate target base station 1*h*-10 that receives the message may transfer a conditional handover request ack message to the serving base station 1*h*-5 in operation 1*h*-25. The conditional handover request ack message may include radio resource information to be applied to the UE 1*h*-1, random access channel (RACH) resource information, and a valid time during which the corresponding RACH resource information is valid. In addition, the conditional handover request ack message may include a timer value and the like used for determining a handover failure if a conditional handover is performed. When the serving base station 1*h*-5 receives the conditional handover request ack message, the serving base station 1*h*-5 may produce a condition for performing a conditional handover to the corresponding candidate target base station 1*h*-10 in operation 1*h*-30. The produced condition for performing a conditional handover may be transferred to the UE 1*h*-1, together with information produced by the candidate target base station 1*h*-10 and configuration information to be applied to the UE 1*h*-1, in operation 1*h*-35. In this instance, the message may be an RRCreconfiguration message. The information transferred to the UE 1*h*-1 may include a measurement object associated with a conditional handover to the cell of the corresponding candidate target base station 1*h*-10, a report configuration (the type of event, offset information of received power (RSRP or RSRQ, RSSI) applied to each event, absolute value information of received power, and the like), radio resource information to be used for the corresponding candidate target cell 1*h*-10, RACH configuration information, time information during which an RACH resource is valid, timer value information for determining a handover failure, and the like. If multiple candidate target cells 1*h*-10 are present, a measurement object associated with a conditional handover, a report configuration (the type of event, offset information of received power (RSRP or RSRQ, RSSI) applied to each event, absolute value information of received power, and the like), radio resource information to be used for the corresponding candidate target cell 1*h*-10, RACH configuration information, time information during which RACH resource is valid, timer value information for determining a handover failure, and the like for each candidate target cell 1*h*-10 may be transferred to the UE 1*h*-1. As another example, even though multiple candidate target cells 1*h*-10 are present, the timer value information for determining a handover failure may be transferred as a single value. The UE 1*h*-1 that receives the information may perform measurement for a conditional handover associated with the target candidate cell 1h-10 in operation 1h-40. If a measurement condition given in operation 1h-35, that is, any one of events included in a report configuration, is satisfied while the measurement is being performed, the UE 1h-1 may perform a conditional handover to the candidate target cell 1h-10 associated with the corresponding event in operation 1h-45. Performing the conditional handover may include an operation of performing, by the UE 1h-1, random access to the target cell 1h-10 associated with the satisfied event among the given candidate target cells in operation 1h-50, an operation of receiving a random access response (RAR) from the target cell 1h-10 in operation 1h-55, and an operation of transferring a handover complete message to the target cell 1h-10 using a UL grant included in the RAR in operation 1h-60.

In association with the operation of the timer received in operation 1h-35, the UE 1h-1 may start the timer for determining a handover failure if at least one condition of measurement report transmission events, which are given as a condition for a conditional handover, is satisfied (more particularly, if the reportType is set to eventTriggered or conditional HO and if the entry condition applicable for this event, i.e., the event corresponding with the eventId of the corresponding reportConfig within VarMeasConfig, is fulfilled for one or more applicable cells indicated as candidate target cells for this event or eventId or reportConfig for all measurements after layer 3 filtering taken during timeToTrigger defined for this event within the VarMeasConfig, while the VarMeasReportList does not include a measurement reporting entry for this measId (a first cell triggers the event)), if the UE 1h-1 starts a random access operation with respect to one of target candidate cells which are associated with a conditional handover after the given condition is satisfied, if the UE 1h-1 transmits a random access preamble to one of the corresponding candidate target cells, if the UE 1h-1 successfully receives an RAR from a cell to which a random access preamble is transmitted, or if the UE 1h-1 selects a predetermined cell among the candidate cells that satisfy a condition, and performs a conditional handover. In addition, if a radio link failure (RLF) or a handover failure occurs, the UE performs cell selection. If a selected cell is a cell to which a conditional handover is configured, the UE may perform a conditional handover to the corresponding cell and starts the corresponding timer for determining a handover failure.

In association with stopping the timer, the UE 1h-1 may stop the corresponding timer if random access to the corresponding candidate target cell 1h-10 is successfully performed, if the UE 1h-1 transfers an RRCReconfigurationComplete message to a lower layer, if an MAC layer successfully finishes a random access operation, or if an MAC successfully receives PDCCH transmission associated with a C-RNTI.

In association with the operation of the timer, if the corresponding timer starts and expires before a handover is successfully performed, the UE 1h-1 may fall back to the cell of the existing serving base station 1h-5; or may perform an RRC re-establishment operation in the case of expiration in an MCG. Alternatively, in the case of expiration in an SCG, the UE 1h-1 may perform an SCGfailure information operation. Alternatively, the UE 1h-1 may be changed to an idle mode.

In association with a conditional handover operation, the operation of a handover timer for a normal handover may be modified. As an example, in the case in which the condition for a conditional handover and target cell information are present in a reconfigurationWithSync information element, if the UE 1h-1 receives reconfigurationWithSync that does not include conditional handover information, the UE 1h-1 may operate a handover timer.

Figure 1I:
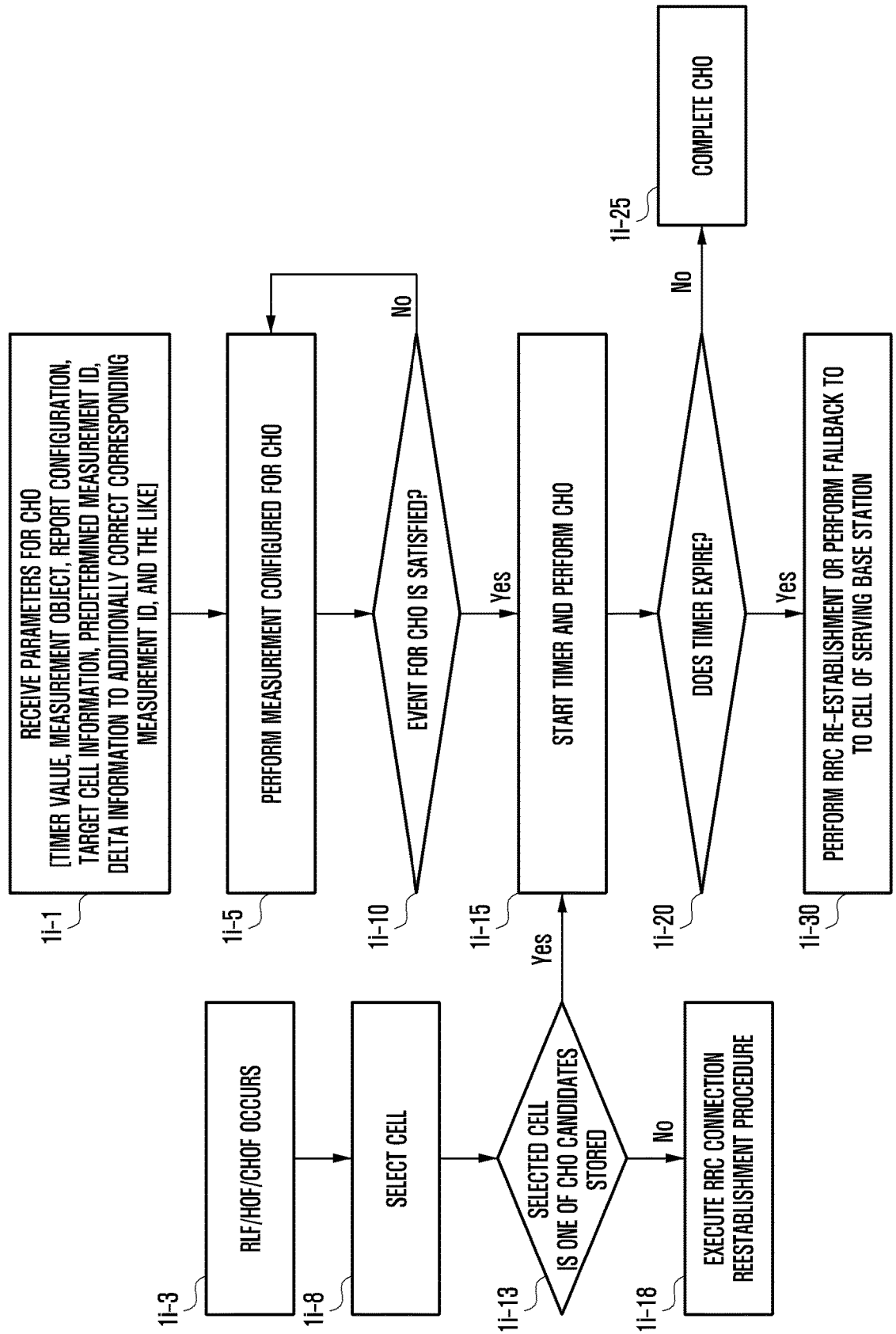
FIG. 1I is a diagram illustrating the operation of a UE in the case in which a timer is applied to a conditional handover and the timer starts if a condition for a conditional handover measurement report is satisfied, according to an embodiment of the disclosure.

FIG. 1I is a diagram illustrating the operation of a UE in the case in which a timer is applied to a conditional handover and the timer starts if a condition for a conditional handover measurement report is satisfied, according to an embodiment of the disclosure.

Referring to FIG. 1I, a UE may receive, from a serving base station, a timer value to be applied, a measurement object, a report configuration, target cell information, a previously configured measurement ID, delta information to additionally correct the corresponding measurement ID, and the like in operation 1i-1. After receiving the information, the UE may perform a given measurement for a conditional handover in operation 1i-5. While the UE is performing the measurement, if an event as a conditional handover-related measurement report trigger is satisfied in operation 1i-10, the UE may start a timer, and may perform a conditional handover in operation 1i-15. Here, a conditional handover operation is defined as the case of the operation of starting a timer mentioned in FIG. 1H. If the timer expires in operation 1i-20 while the conditional handover is being performed, the UE may perform an RRC re-establishment operation or an SCGfailure information operation, or may perform a fallback to the cell of the existing serving base station in operation 1i-30. If the timer of the UE does not expire, this may indicate that the conditional handover is complete in operation 1i-25.

As another example, irrespective of whether a given condition is satisfied in operation 1i-10, if the UE declares an RLF in association with a serving cell connection, or the UE fails while performing a normal handover or a conditional handover to another cell in operation 1i-03, the UE performs a cell selection process in operation 1i-8, and if a selected cell is one of the candidate cells of the conditional handover configuration information that the UE currently stores in operation 1i-13, the UE may perform a conditional handover to the corresponding cell. When performing the conditional handover, the UE may start a timer. If the selected cell is not any one of the candidate cells for the conditional handover, the UE may perform an RRC connection re-establishment operation in operation 1i-18.

Figure 1J:
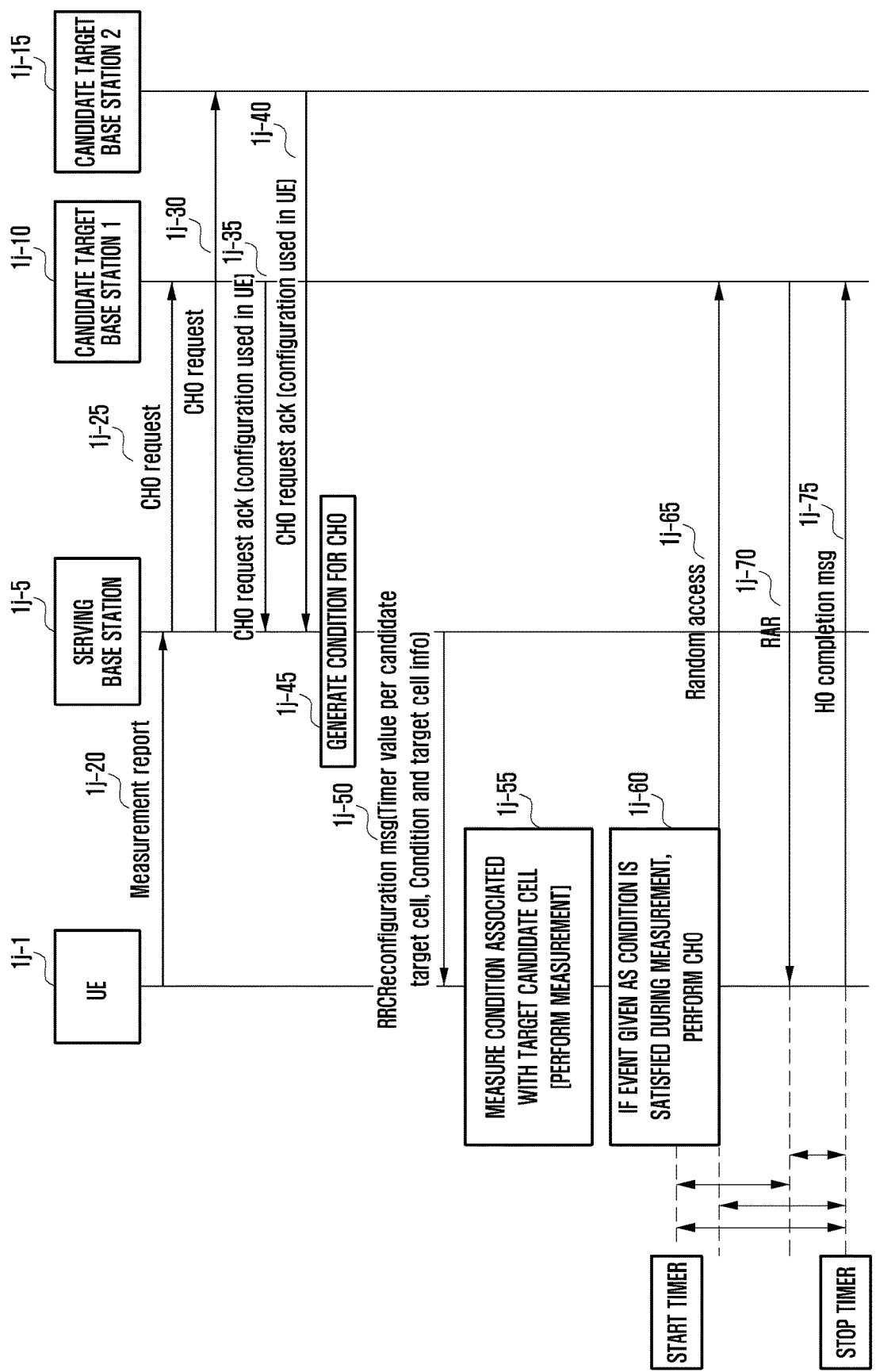
FIG. 1J is a diagram illustrating the case in which a timer is applied to a conditional handover and multiple candidate target cells are operated according to an embodiment of the disclosure.

FIG. 1J is a diagram illustrating the case in which a timer is applied to a conditional handover and multiple candidate target cells are operated according to an embodiment of the disclosure.

Referring to FIG. 1J, a UE 1j-1 is connected to a serving base station 1j-5. The UE 1j-1 may transfer a measurement result to the serving base station 1j-5 according to a previously configured measurement configuration in operation 1j-20. The serving base station 1j-5 may transmit a conditional handover request message to multiple candidate target base stations 1j-10 and 1j-15 which are regarded as target base stations in operation 1j-25 and 1j-30. The conditional handover request message may include currently established radio bearer information of the corresponding UE 1j-1, currently configured resource information, and the like, and may be transferred to the candidate target base stations 1j-10 and 1j-15. The candidate target base stations 1j-10 and 1j-15 that receive the conditional handover request message may transfer conditional handover request ack messages to the serving base station 1j-5 in operation 1j-35 and 1j-40. The conditional handover request ack message may include radio resource information to be applied to the UE 1j-1, RACH resource information, and a valid time during which the corresponding RACH resource information is valid. In addition, the conditional handover request ack message may include a timer value and the like to be used for determining a handover failure if a conditional handover is performed. The information may be included in the corresponding conditional handover request ack message for each candidate target base station 1j-10 and 1j-15, and may be transferred to the serving base station 1j-5. If the serving base station 1j-5 receives the conditional handover request ack message, the serving base station 1j-5 may produce a condition for performing a conditional handover to the corresponding candidate target base station 1j-10 and 1j-15 in operation 1h-45. The produced information may be transferred to the UE 1j-10, together with information produced by the candidate target base station 1j-10 and 1j-15, and configuration information to be applied to the UE 1j-1, in operation 1j-50. In this instance, the message may be an RRCreconfiguration message. The information transferred to the UE 1j-10 may be measurement information, which is a condition for performing a conditional handover to the cell of the corresponding candidate target base station 1j-10 or 1j-15, and serving cell configuration information that the UE is to use in the corresponding cell. The measurement information, which is the condition, may be expressed as a plurality of measurement IDs, and each measurement ID may be expressed as a measurement object or a report configuration (e.g., the type of event, offset information of received power (RSRP or RSRQ, RSSI) applied to each event, absolute value information of received power, and the like). In addition, the serving cell configuration information may include radio resource information to be used in the corresponding candidate target cell 1j-10 or 1j-15, RACH configuration information, time information during which an RACH resource is valid, timer value information for determining a handover failure, and the like. If multiple candidate target cells 1j-10 and 1j-15 are present, a measurement object associated with a conditional handover, a report configuration (the type of event, offset information of received power (RSRP or RSRQ, RSSI) applied to each event, absolute value information of received power, and the like), radio resource information to be used for the corresponding candidate target cell 1j-10 or 1j-15, RACH configuration information, time information during which an RACH resource is valid, timer value information for determining a handover failure, and the like for each candidate target cell 1j-10 or 1j-15 may be transferred to the UE 1j-1. If configuration information for the UE 1j-1 for each of the multiple candidate target cells, a CHO condition, and a timer for HO are signaled, the UE 1j-1 may perform a CHO to the candidate target cell 1j-10 or 1j-15 associated with a satisfied condition among the given CHO conditions. In this instance, if a timer for a HO is also signaled for each candidate target cell, the UE 1j-1 may apply a HO timer value associated with the corresponding satisfied condition. As another example, even though multiple candidate target cells 1j-10 and 1j-15 are present, the timer value information for determining a handover failure may be transferred as a single value. In this instance, even though a measurement report triggering event associated with any of the candidate target cells 1j-10 and 1j-15 is satisfied, the timer may be operated by applying the single signaled value as a timer value.

In operation 1j-50, the UE 1j-1 that receives the information may perform a measurement for a conditional handover associated with the target candidate cell in operation 1j-55. If multiple measurements are configured, the UE 1j-1 may perform the multiple measurements in parallel. If a measurement condition given in operation 1j-50, that is, any one of the events included in a report configuration, is satisfied, while the UE 1j-1 is performing the measurement, the UE may select one of the simultaneously satisfied candidate cells as a target cell. The UE 1j-1 may perform a conditional handover to the corresponding target cell in operation 1j-60. In the process of performing the conditional handover, the UE 1j-1 may perform random access to the base station 1j-10 of the target cell associated with the satisfied event among the given candidate target cells in operation 1j-65. In addition, the UE 1j-1 may receive a random access response (RAR) from the corresponding candidate target cell in operation 1j-70, and may transfer a handover complete message to the base station 1j-10 of the target cell using a UL grant included in the RAR, in operation 1j-75.

In association with the operation of the timer received in operation 1j-50, the UE 1j-1 may start the timer for determining a handover failure if at least one condition of measurement report transmission events, which are given as a condition for a conditional handover, is satisfied (more particularly, if the reportType is set to eventTriggered or conditional HO and if the entry condition applicable for this event, i.e., the event corresponding with the eventId of the corresponding reportConfig within VarMeasConfig, is fulfilled for one or more applicable cells indicated as candidate target cells for this event or eventId or reportConfig for all measurements after layer 3 filtering taken during timeToTrigger defined for this event within the VarMeasConfig, while the VarMeasReportList does not include a measurement reporting entry for this measId (a first cell triggers the event)); if the UE 1j-1 starts a random access operation with respect to one of target candidate cells which are associated with a conditional handover after the given condition is satisfied; if the UE 1j-1 transmits a random access preamble to one of the corresponding candidate target cells; or if the UE 1j-1 successfully receives an RAR from a cell to which a random access preamble is transmitted. In association with stopping the timer, the UE 1j-1 may stop the corresponding timer if random access to the corresponding candidate target cell is successfully performed; if the UE 1j-1 transfers an RRCReconfigurationComplete message to a lower layer; if an MAC layer successfully finishes a random access operation; or if an MAC successfully receives PDCCH transmission associated with a C-RNTI.

In association with the operation of the timer, if the corresponding timer starts and expires before a handover is successfully performed, the UE 1j-1 may fall back to the cell of the existing serving base station 1j-5; or may perform an RRC re-establishment operation in the case of expiration in an MCG. Alternatively, in the case of expiration in an SCG, the UE 1j-1 may perform an SCGfailure information operation. Alternatively, the UE 1j-1 may be changed to an idle mode.

In association with a conditional handover operation, the operation of a handover timer for a normal handover may be modified. As an example, in the case in which a condition for a conditional handover and target cell information are present in a reconfigurationWithSync information element, the UE 1j-1 may operate a handover timer if the UE 1j-1 receives reconfigurationWithSync that does not include conditional handover information.

Figure 1K:
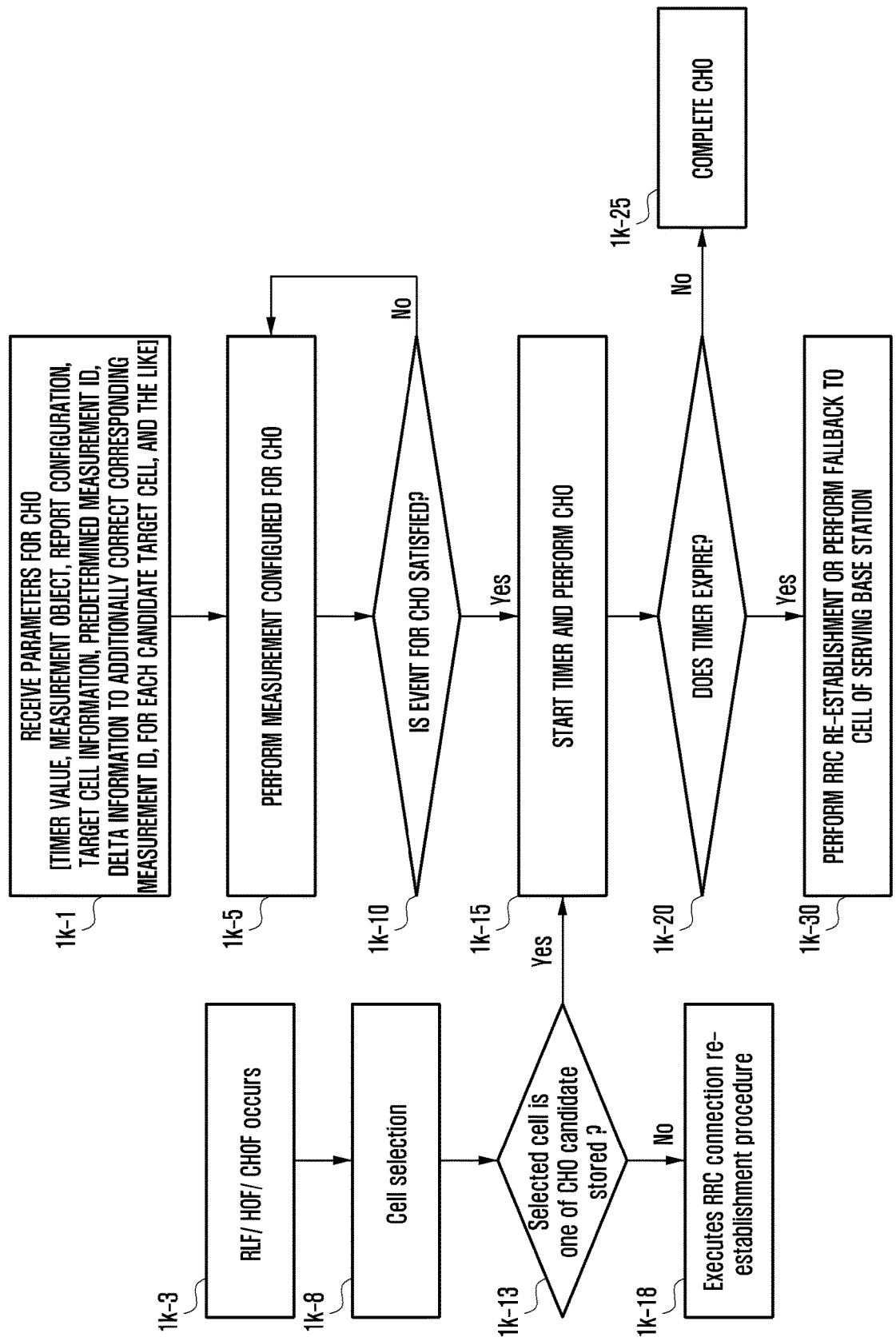
FIG. 1K is a diagram illustrating the operation of a UE when multiple candidate target cells are operated in a conditional handover according to an embodiment of the disclosure.

FIG. 1K is a diagram illustrating the operation of a UE in the case in which multiple candidate target cells are operated in a conditional handover and a timer starts when a condition for a conditional handover measurement report is satisfied according to an embodiment of the disclosure.

Referring to FIG. 1K, a UE may receive, from a serving base station, a timer value to be applied, a measurement object, a report configuration, target cell information, a previously configured measurement ID, delta information to additionally correct the corresponding measurement ID, and the like in operation 1k-1. The information may be given for each target candidate cell. In the case of a timer value, a timer value may be provided for each candidate target cell, or one timer value may be provided for a plurality of candidate target cells, or a timer value may be provided for each group of candidate target cells. After receiving the information, the UE may perform a given measurement for a conditional handover in operation 1k-5. While the UE is performing the measurement, if any one event as a conditional handover-related measurement report trigger is satisfied in operation 1k-10, the UE may start a timer, and may perform a conditional handover in operation 1k-15. If a base station provides a timer for each group of candidate target cells, the UE may start a timer using a timer value associated with a candidate target cell group (a group of candidate target cells) to which the event that is satisfied in operation 1k-10 belongs. Here, a conditional handover operation is defined as the case of the operation of starting a timer mentioned in FIG. 1J. If the timer expires in operation 1k-20 while the conditional handover is being performed, the UE may perform an RRC re-establishment operation in the case of a PCell handover in an MCG, may perform an SCGfailure information operation in the case of a PSCell handover in an SCG, or may perform a fallback to the cell of the existing serving base station in operation 1k-30. If the timer of the UE does not expire, this may indicate that the conditional handover is complete in operation 1k-25.

As another example of the operation, irrespective of whether a given condition is satisfied in operation 1k-10, if the UE declares an RLF in association with a serving cell connection, or the UE fails while performing a normal handover or a conditional handover to another cell in operation 1k-3, the UE performs a cell selection process in operation 1k-8, and if a selected cell is one of the candidate cells of conditional handover configuration information that the UE currently stores in operation 1k-13, the UE may perform a conditional handover to the corresponding cell. When performing the conditional handover, the UE may start a timer. If the selected cell is not any one of the candidate cells for the conditional handover, the UE may perform an RRC connection re-establishment operation in operation 1k-18.

Figure 2A:
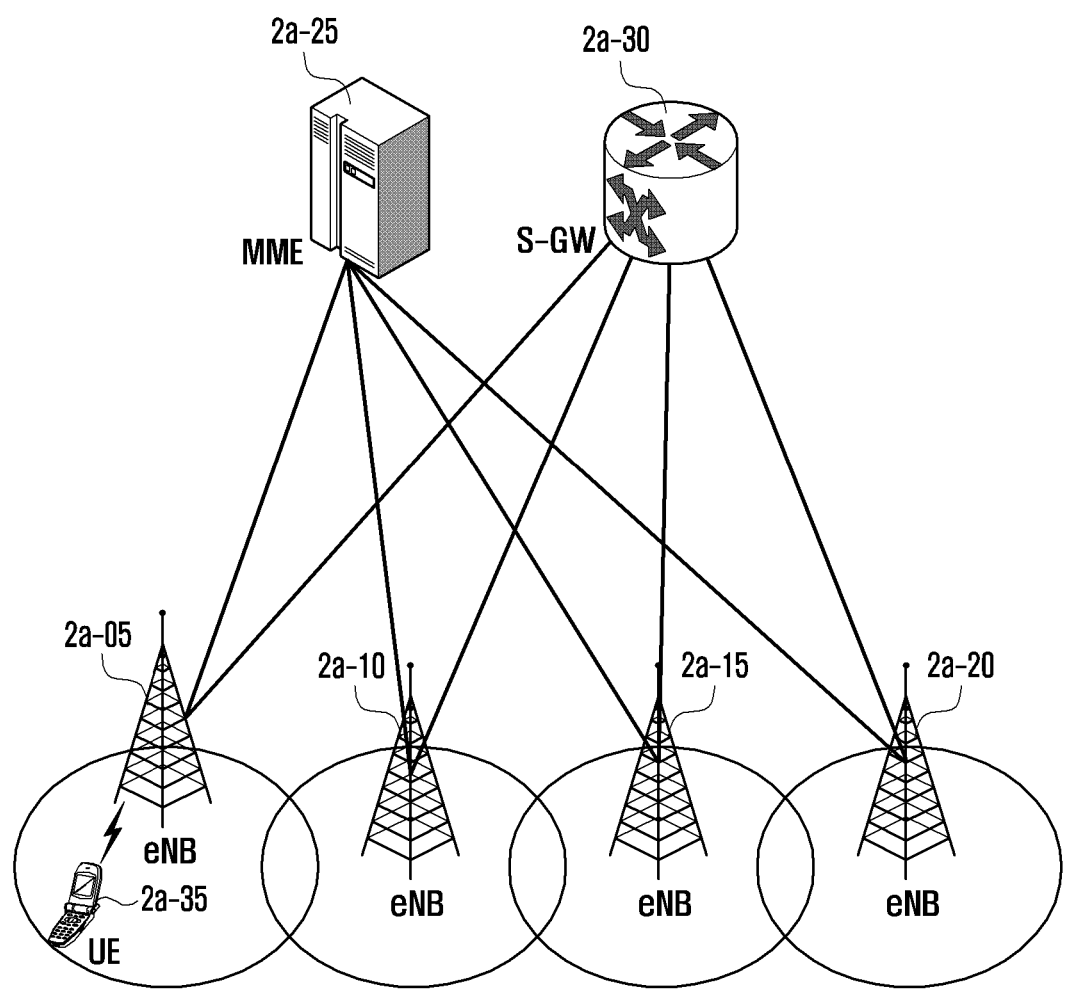
FIG. 2A is a diagram illustrating the structure of an LTE system according to an embodiment of the disclosure.

FIG. 2A is a diagram illustrating the structure of an LTE system according to an embodiment of the disclosure.

Referring to FIG. 2A, as illustrated in the drawings, a radio access network of an LTE system may include a next generation base station (an evolved Node B (ENB), a Node B, or a base station) 2a-05, 2a-10, 2a-15, and 2a-20, a mobility management entity (MME) 2a-25, and a serving-gateway (S-GW) 2a-30. A user equipment (UE) (or a terminal) 2a-35 may access an external network via the ENB 2a-05 to 2a-20 and the S-GW 2a-30.

In FIG. 2A, the ENB 2a-05 to 2a-20 may correspond to a legacy Node B in a UMTS system. The ENB is connected to the UE 2a-35 via a wireless channel, and may perform a more complex role than the legacy Node B. In the LTE system, real-time services, such as a voice over IP (VoIP) based on an Internet protocol, and all user traffic may be provided via a shared channel. Accordingly, there is a desire for a device that performs scheduling by collecting state information, such as the buffer states, available transmission power states, channel states, and the like associated with UEs, and the ENB 2a-05 to 2a-20 may be in charge of it. A single ENB may generally control a plurality of cells. For example, in order to implement a transmission rate of 100 Mbps, the LTE system may use an orthogonal frequency division multiplexing (OFDM) as a radio access technology in a bandwidth of 20 MHz. Further, the ENB may apply an adaptive modulation and coding (AMC) scheme which determines a modulation scheme and a channel coding rate based on the channel state of the UE. The S-GW 2a-30 is a device for providing a data bearer, and produces or removes a data bearer according to the control by the MME 2a-25. The MME is a device that is in charge of various control functions in addition to a mobility management function associated with a UE, and may be connected to a plurality of base stations.

Figure 2B:
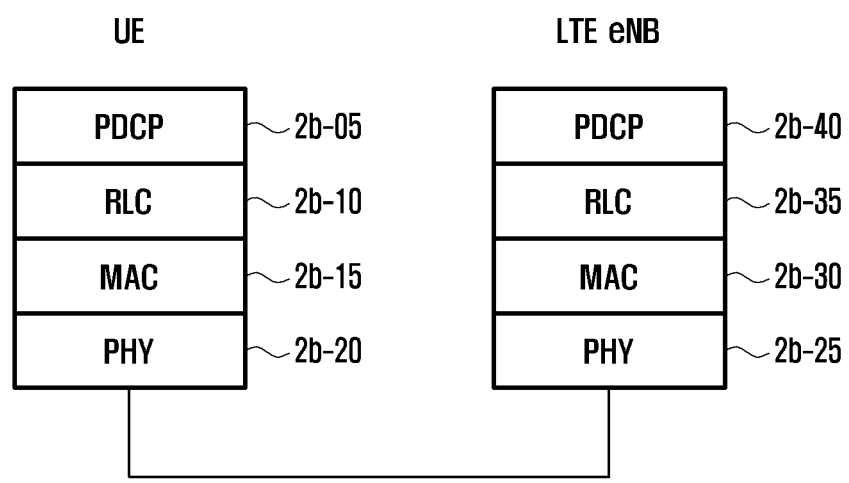
FIG. 2B is a diagram illustrating the structure of a radio protocol of an LTE system according to an embodiment of the disclosure.

FIG. 2B is a diagram illustrating the structure of a radio protocol of an LTE system according to an embodiment of the disclosure.

Referring to FIG. 2B, the radio protocol of the LTE system may include a packet data convergence protocol (PDCP) 2b-05 and 2b-40, a radio link control (RLC) 2b-10 and 2b-35, a medium access control (MAC) 2b-15 and 2b-30 for each of a UE and an ENB. A PDCP is in charge of IP header compression/decompression, or the like. The main function of the PDCP may be summarized as follows. However, the function is not limited to the following example.

header compression and decompression (Header compression and decompression: ROHC only):
transfer of user data
sequential delivery (in-sequence delivery of upper layer PDUs at PDCP re-establishment procedure for RLC AM)
reordering (for split bearers in DC (only support for RLC AM): PDCP PDU routing for transmission and PDCP PDU reordering for reception)
duplicate detection (duplicate detection of lower layer SDUs at PDCP re-establishment procedure for RLC AM)
retransmission (retransmission of PDCP SDUs at handover and, for split bearers in DC, of PDCP PDUs at PDCP data-recovery procedure, for RLC AM)
ciphering and deciphering
timer-based SDU discard (timer-based SDU discard in uplink)

According to some embodiments, a radio link control (RLC) 2b-10 and 2b-35 may reconfigure a PDCP packet data unit (PDU) to have an appropriate size and may perform an ARQ operation or the like. The main function of the RLC may be summarized as follows. However, the function is not limited to the following example.

transfer of data (transfer of upper layer PDUs)
ARQ (error correction through ARQ (only for AM data transfer))
concatenation, segmentation and reassembly (concatenation, segmentation and reassembly of RLC SDUs (only for UM and AM data transfer))
re-segmentation (re-segmentation of RLC data PDUs (only for AM data transfer))
reordering (reordering of RLC data PDUs (only for UM and AM data transfer)
duplicate detection (duplicate detection (only for UM and AM data transfer))
error detection (protocol error detection (only for AM data transfer))
RLC SDU discard (RLC SDU discard (only for UM and AM data transfer))
RLC re-establishment According to an embodiment, the MAC 2b-15 and 2b-30 is connected with various RLC layer devices configured for one UE, and multiplexes RLC PDUs to a MAC PDU and demultiplexes RLC PDUs from a MAC PDU. The main function of the MAC may be summarized as follows. However, this is not limited to the following example.

mapping (mapping between logical channels and transport channels)

multiplexing and demultiplexing (multiplexing/demultiplexing of MAC SDUs belonging to one or different logical channels into/from transport blocks (TB) delivered to/from the physical layer on transport channels)

scheduling information reporting

HARQ (error correcting through HARQ)

priority handling between logical channels (priority handling between logical channels of one UE)

priority handling between UEs (priority handling between UEs by means of dynamic scheduling)

MBMS service identification transport format selection padding

According to some embodiments, the PHY layers 2b-20 and 2b-25 may perform an operation of channel-coding and modulating higher layer data to produce an OFDM symbol and transmitting the OFDM symbol via a wireless channel, or may perform an operation of demodulating and channel-decoding an OFDM symbol received via a wireless channel and transmitting the demodulated and channel-decoded OFDM symbol to a higher layer. However, this is not limited to the following example.

Figure 2C:
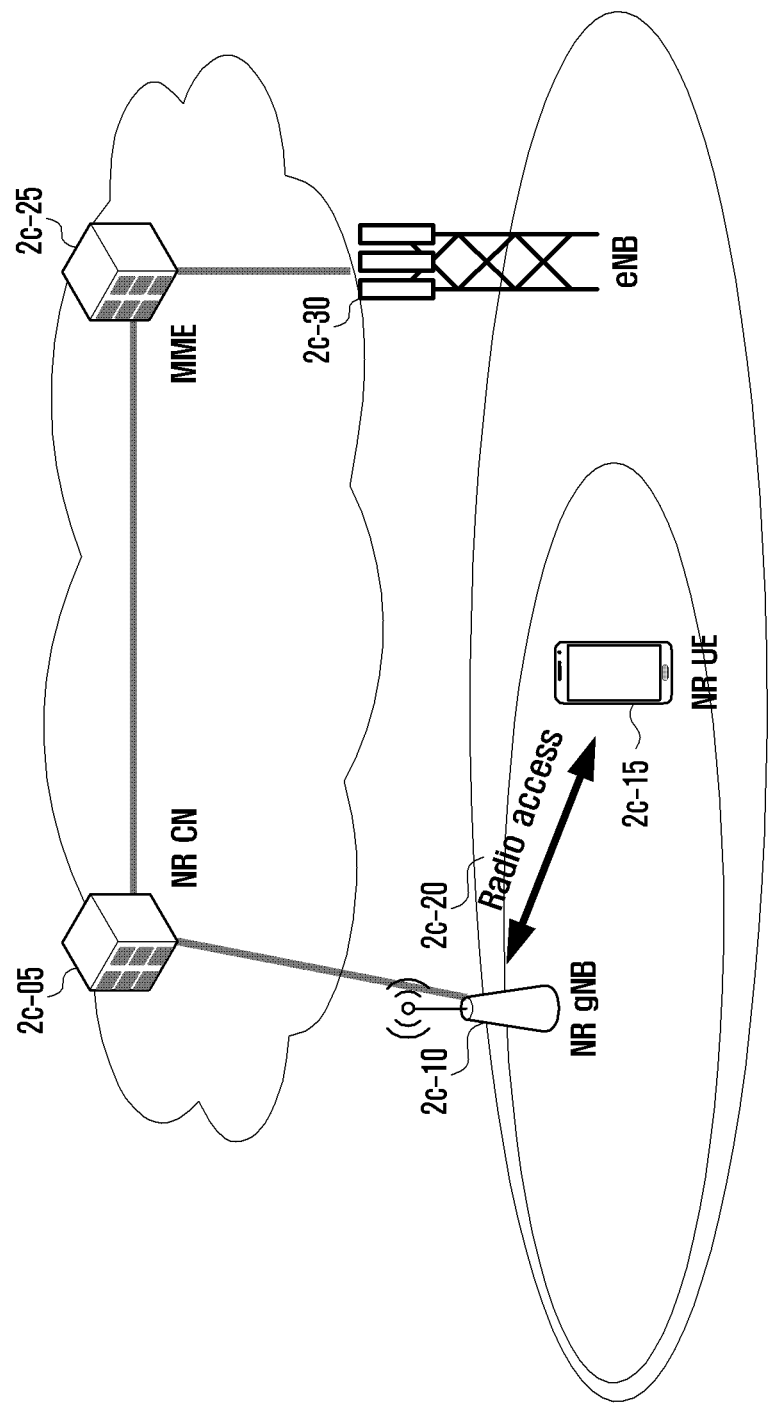
FIG. 2C is a diagram illustrating the structure of a next generation mobile communication system according to an embodiment of the disclosure.

FIG. 2C is a diagram illustrating the structure of a next generation mobile communication system according to an embodiment of the disclosure.

Referring to FIG. 2C, a radio access network of a next generation mobile communication system (hereinafter, NR or 2g) may include a next generation base station (new radio node B (hereinafter, an NR gNB or an NR base station)) 2c-10 and a next generation radio core network (new radio core network (NR CN)) 2c-05. A next generation radio user equipment (new radio user equipment (NR UE) (or a UE)) 2c-15 may access an external network via an NR gNB 2c-10 and an NR CN 2c-05.

In FIG. 2C, the NR gNB 2c-10 may correspond to an Evolved Node B (eNB) of a legacy LTE system. The NR gNB is connected to the NR UE 2c-15 via a wireless channel, and may provide a better service than a service from the legacy NodeB. In the next generation mobile communication system, all user traffic is serviced via a shared channel. Accordingly, there is a desire for a device that performs scheduling by collecting state information such as the buffer states, available transmission power states, channel conditions, and the like in association with UEs, and the NR NB 2c-10 may be in charge of the same. A single NR gNB may generally control a plurality of cells. In order to implement ultra-high speed data transmission when compared to legacy LTE, a bandwidth greater than or equal to the current maximum bandwidth may be applied in the next generation mobile communication system. In addition, an orthogonal frequency division multiplexing (OFDM) may be used as a radio access technology and a beamforming technology may be additionally used.

In addition, the NR gNB may apply an adaptive modulation & coding (AMC) scheme that determines a modulation scheme and a channel coding rate based on the channel state of a UE. The NR CN 2c-05 may perform a function of supporting mobility, configuring a bearer, configuration a QoS, and the like. The NR CN 2c-05 is a device that is in charge of various control functions in addition to a mobility management function associated with a UE, and may be connected to a plurality of base stations. In addition, the next generation mobile communication system may interoperate with a legacy LTE system, and an NR CN may be connected to an MME 2c-25 via a network interface. The MME may be connected to an eNB 2c-30 which is a legacy base station.

Figure 2D:
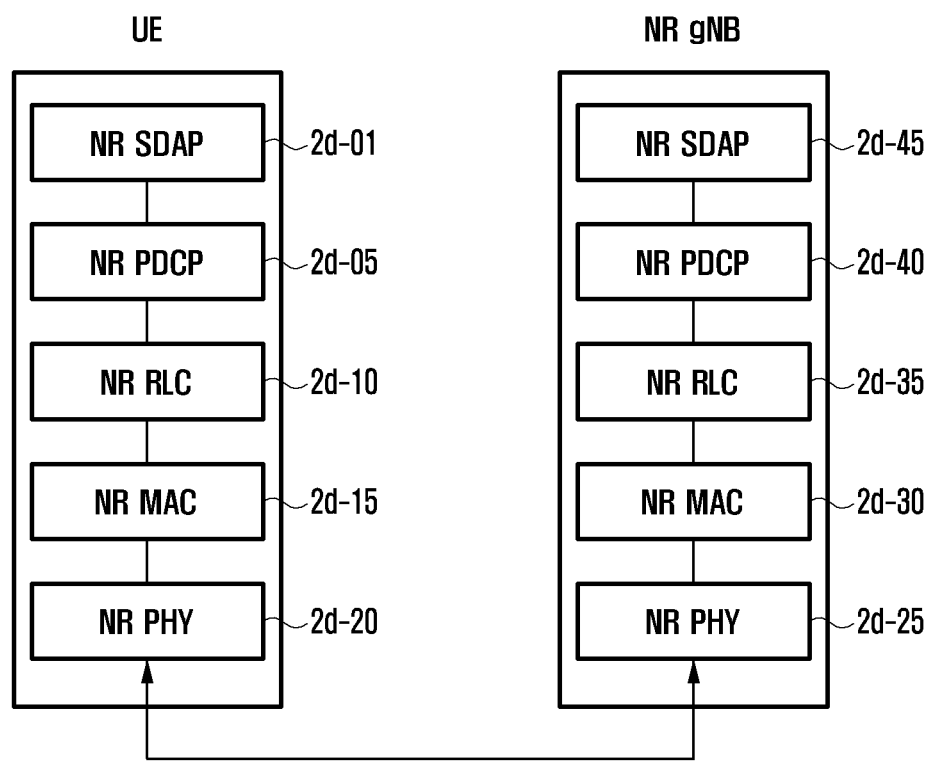
FIG. 2D is a diagram illustrating the structure of a radio protocol of a next generation mobile communication system according to an embodiment of the disclosure.

FIG. 2D is a diagram illustrating the structure of a radio protocol of a next generation mobile communication system according to an embodiment of the disclosure.

Referring to FIG. 2D, the radio protocol of the next generation mobile communication system may include an NR service data adaptation protocol (SDAP) 2d-01 and 2d-45, an NR PDCP 2d-05 and 2d-40, an NR RLC 2d-10 and 2d-35, and an NR MAC 2d-15 and 2d-30 for each of a UE and an NR gNB.

According to some embodiments, the main functions of the NR SDAP 2d-01 and 2d-45 may include some of the following functions. However, this is not limited to the following example.

transfer of user data (transfer or user plane data)

mapping between a QoS flow and a data bearer (DRB) for both downlink and uplink marking a QoS flow ID in both DL and UL packets reflective QoS flow to DRB mapping for uplink SDAP PDUs In association with an SDAP layer device, whether to use the header of the SDAP layer device or whether to use the function of the SDAP layer device may be configured for the UE via a radio resource control (RRC) message for each PDCP layer device, for each bearer, or for each logical channel. If the SDAP header is configured, the UE may provide an indication using a non-access stratum (NAS) reflective quality of service (QoS) configuration one-bit indicator and an access stratum (AS) reflective QoS configuration one-bit indicator of the SDAP header so that the UE updates or reconfigures mapping information between a QoS flow and a data bearer in an uplink and a downlink. According to some embodiments, the SDAP header may include QoS flow ID information indicating a QoS. According to some embodiments, the QoS information may be may be used as data processing priority, scheduling information, or the like for supporting a smooth service.

According to some embodiments, the main functions of the NR PDCP 2d-05 and 2d-40 may include some of the following functions. However, this is not limited to the following example.

header compression and decompression (Header compression and decompression: ROHC only):

transfer of user data sequential delivery (in-sequence delivery of upper layer PDUs)

non-sequential delivery (out-of-sequence delivery of upper layer PDUs)

reordering (PDCP PDU reordering for reception)

duplicate detection (duplicate detection of lower layer SDUs)

retransmission (retransmission of PDCP SDUs)

ciphering and deciphering timer-based SDU discard (timer-based SDU discard in uplink)

The mentioned reordering function of the NR PDCP device is a function of sequentially reordering PDCP PDUs received from a lower layer according to a PDCP sequence number (SN). The reordering function may include a function of transferring sequentially reordered data to a higher layer, a function of immediately transferring data irrespective of a sequence, a function of recording lost PDCP PDUs after sequential recording, a function of reporting the states of the lost PDCP PDUs to a transmission side, and a function of requesting retransmission of the lost PDCP PDUs.

According to some embodiments, the main functions of the NR RLC 2*d*-10 and 2*d*-35 may include some of the following functions. However, this is not limited to the following example.

transfer of data (transfer of upper layer PDUs)

sequential delivery (in-sequence delivery of upper layer PDUs)

non-sequential delivery (out-of-sequence delivery of upper layer PDUs)

ARQ (error correcting through ARQ)

concatenation, segmentation, and reassembly (concatenation, segmentation and reassembly of RLC SDUs)

re-segmentation (re-segmentation of RLC data PDUs)

reordering (reordering of RLC data PDUs)

duplicate detection error detection (protocol error detection)

RLC SDU discard

RLC re-establishment

The mentioned in-sequence delivery function of the NR RLC device is a function of sequentially transferring RLC SDUs, received from a lower layer, to a higher layer If a single original RLC SDU is divided into multiple RLC SDUs and the multiple RLC SUDs are received, the in-sequence delivery function of the NR RLC device may include a function of re-assembling the RLC SDUs and transferring the same.

The in-sequence delivery function of the NR RLC device may include a function of reordering received RLC PDUs according to an RLC sequence number (SN) or a PDCP SN, and a function of recording lost RLC PDUs after sequential reordering, a function of reporting the states of the lost RLC PDUs to a transmission side, and a function of requesting retransmission of the lost RLC PDUs.

The in-sequence delivery function of the NR RLC device may include a function of sequentially transferring only RLC SDUs before a lost RLC SDU, to a higher layer, if a lost RLC SDU exists.

The in-sequence delivery function of the NR RLC device may include a function of sequentially transferring all RLC SDUs, received before a predetermined timer starts, to a higher layer even though a lost RLC SDU exists, if the predetermined timer expires.

The in-sequence delivery function of the NR RLC device may include a function of sequentially transferring all RLC SDUs, received up to the present, to a higher layer even though a lost RLC SDU exists, if a predetermined timer expires.

The NR RLC device may process RLC PDUs in order of reception, irrespective of a sequence number (out-of-sequence delivery), and may transmit the same to the NR PDCP device.

In the case in which the NR RLC device receives a segment, the NR RLC device receives segments, which are stored in a buffer or which are to be received in the future, reconfigures the segments as a single intact RLC PDU, and transmits the same to the NR PDCP device.

The NR RLC layer may not include a concatenation function. In addition, the concatenation function may be performed in the NR MAC layer or may be replaced with a multiplexing function in the NR MAC layer.

The above-mentioned out-of-sequence delivery function of the NR RLC device is a function of transferring RLC SDUs, received from a lower layer, to a higher layer, irrespective of a sequence. In the case in which a single original RLC SDU is divided into multiple RLC SDUs and the multiple RLC SDUs are received, the out-of-sequence delivery function of the NR RLC device may include a function of re-assembling the RLC SUDs and transmitting the same. The out-of-sequence delivery function of the NR RLC device may include a function of storing the RLC SN or PDCP SN of received RLC PDUs, sequentially ordering the same, and recording lost RLC PDUs.

According to some embodiments, the NR MAC 2*d*-15 and 2*d*-30 may be connected to multiple NR RLC layer devices configured for a single UE, and the main functions of the NR MAC may include some of the following functions. However, this is not limited to the following example.

mapping (mapping between logical channels and transport channels)

multiplexing and demultiplexing (multiplexing/demultiplexing of MAC SDUs)

scheduling information reporting

HARQ (error correcting through HARQ)

priority handling between logical channels (priority handling between logical channels of one UE)

priority handling between UEs (priority handling between UEs by means of dynamic scheduling)

MBMS service identification transport format selection padding

Figure 2E:
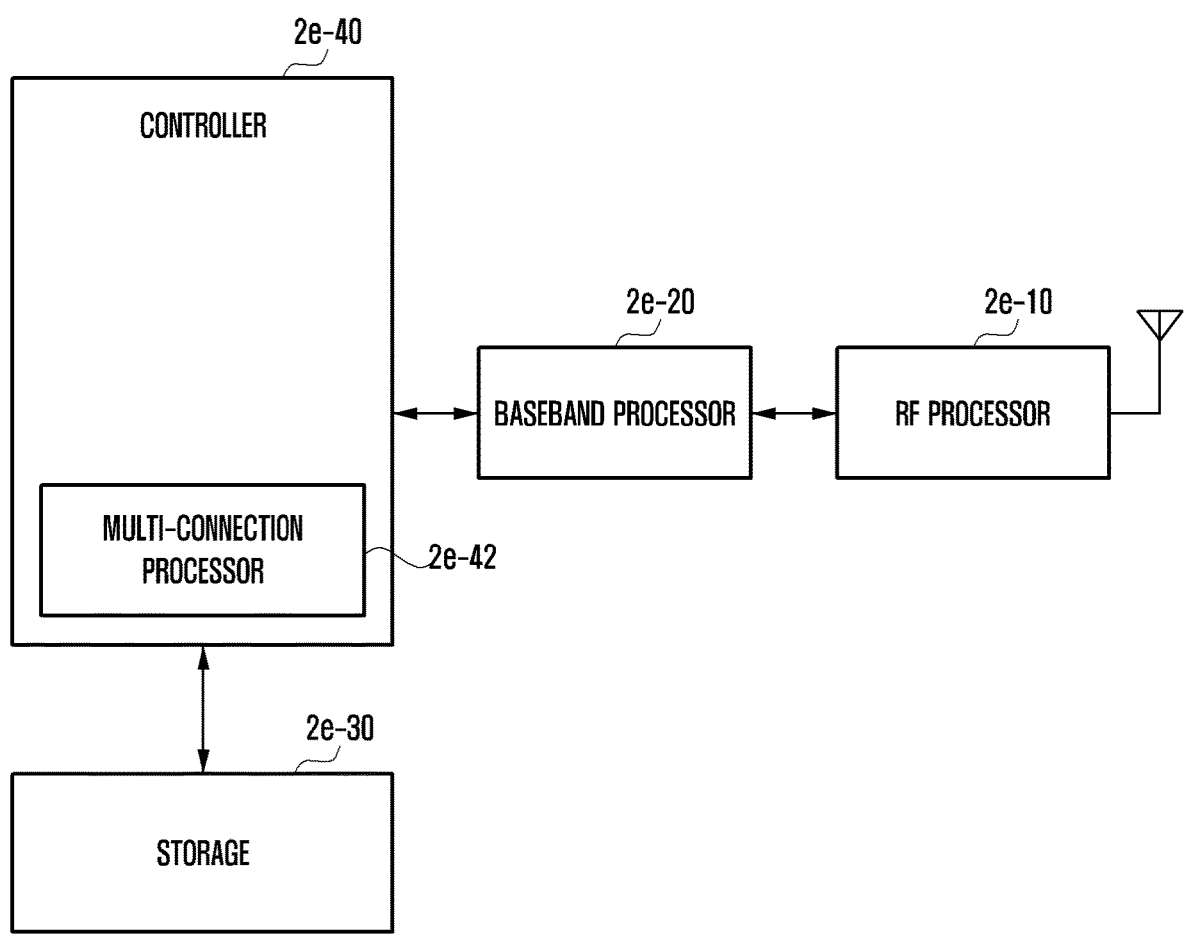
FIG. 2E is a block diagram illustrating the internal structure of a UE according to an embodiment of the disclosure.

The NR PHY layer 2*d*-20 and 2*d*-25 may perform channel-coding and modulating of higher layer data to produce an OFDM symbol and may transmit the OFDM symbol via a wireless channel, or may perform demodulating and channel-decoding of an OFDM symbol, received via a wireless channel, and may transmit the demodulated and channel-decoded OFDM symbol to a higher layer FIG. 2E is a block diagram illustrating the internal structure of a UE according to an embodiment of the disclosure.

Referring to FIG. 2E, the UE may include a radio frequency (RF) processor 2*e*-10, a baseband processor 2*e*-20, a storage 2*e*-30, and a controller 2*e*-40. As a matter of course, the UE is not limited to the above-mentioned example, and may include fewer or more components than the components of FIG. 2E.

The RF processor 2*e*-10 may perform a function, such as band conversion and amplification of a signal, in order to perform signal transmission or reception via a wireless channel. That is, the RF processor 2*e*-10 up-converts a baseband signal provided from the baseband processor 2*e*-20 into an RF band signal, transmits the RF band signal via an antenna, and down-converts an RF band signal received via an antenna into a baseband signal. For example, the RF processor 2*e*-10 may include a transmission filter, a reception filter, an amplifier, a mixer, an oscillator, a digital-to-analog converter (DAC), an analog-to-digital converter (ADC), and the like. However, this is not limited to the above-described example. Although FIG. 2E illustrates only a single antenna, the UE may have a plurality of antennas. In addition, the RF processor 2*e*-10 may include a plurality of RF chains. Moreover, the RF processor 2*e*-10 may perform beamforming. For the beamforming, the RF processor 2*e*-10 may control the phase and the size of each signal transmitted or received via a plurality of antennas or antenna elements. In addition, the RF processor 2*e*-10 may perform multi-input multi-output (MIMO), and may receive multiple layers when performing an MIMO operation.

The baseband processor 2*e*-20 may execute a function of converting between a baseband signal and a bitstream according to the physical layer standard of a system. For example, in the case of data transmission, the baseband processor 2*e*-20 encodes and modulates a transmission bitstream, so as to produce complex symbols. In addition, in the case of data reception, the baseband processor 2e-20, restores a reception bitstream by demodulating and decoding a baseband signal provided from the RF processor 2e-10. For example, according to an orthogonal frequency division multiplexing (OFDM) scheme, in the case of data transmission, the baseband processor 2e-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. In addition, in the case of data reception, the baseband processor 2e-20 divides a baseband signal provided from the RF processor 2e-10 in units of OFDM symbols, reconstructs signals mapped to the subcarriers via a fast Fourier transform (FFT) operation, and then reconstructs a received bitstream via demodulation and decoding.

The baseband processor 2e-20 and the RF processor 2e-10 may transmit and receive signals as described above. Accordingly, the baseband processor 2e-20 and the RF processor 2e-10 may be referred to as a transmitter, a receiver, a transceiver, or a communication unit. Furthermore, at least one of the baseband processor 2e-20 and the RF processor 2e-10 may include a plurality of communication modules in order to support a plurality of different radio access technologies. In addition, at least one of the baseband processor 2e-20 and the RF processor 2e-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band. The UE may perform signal transmission or reception with a base station using the baseband processor 2e-20 and the RF processor 2e-10, and the signal may include control information and data.

The storage 2e-30 may store data, such as a basic program for operating a UE, an application program, configuration information, and the like. Particularly, the storage 2e-30 may store information related to a second access node that performs wireless communication using a second radio access technology. The storage 2e-30 may provide data stored therein in response to a request from the controller 2e-40. The storage 2e-30 may be configured as a storage medium such as ROM, RAM, hard disk, CD-ROM, DVD, and the like, or a combination of storage media. In addition, the storage 2e-30 may include a plurality of pieces of memories.

The controller 2e-40 may control the overall operation of a UE. For example, the controller 2e-40 may perform transmission or reception of a signal via the baseband processor 2e-20 and the RF processor 2e-10. Further, the controller 2e-40 records data in the storage 2e-40 and reads the recorded data. To this end, the controller 2e-40 may include at least one processor. For example, the controller 2e-40 may include a communication processor (CP) that performs control for communication, and an application processor (AP) that controls a higher layer such as an application program. In addition, at least one configuration included in the UE may be implemented as a single chip.

Figure 2F:
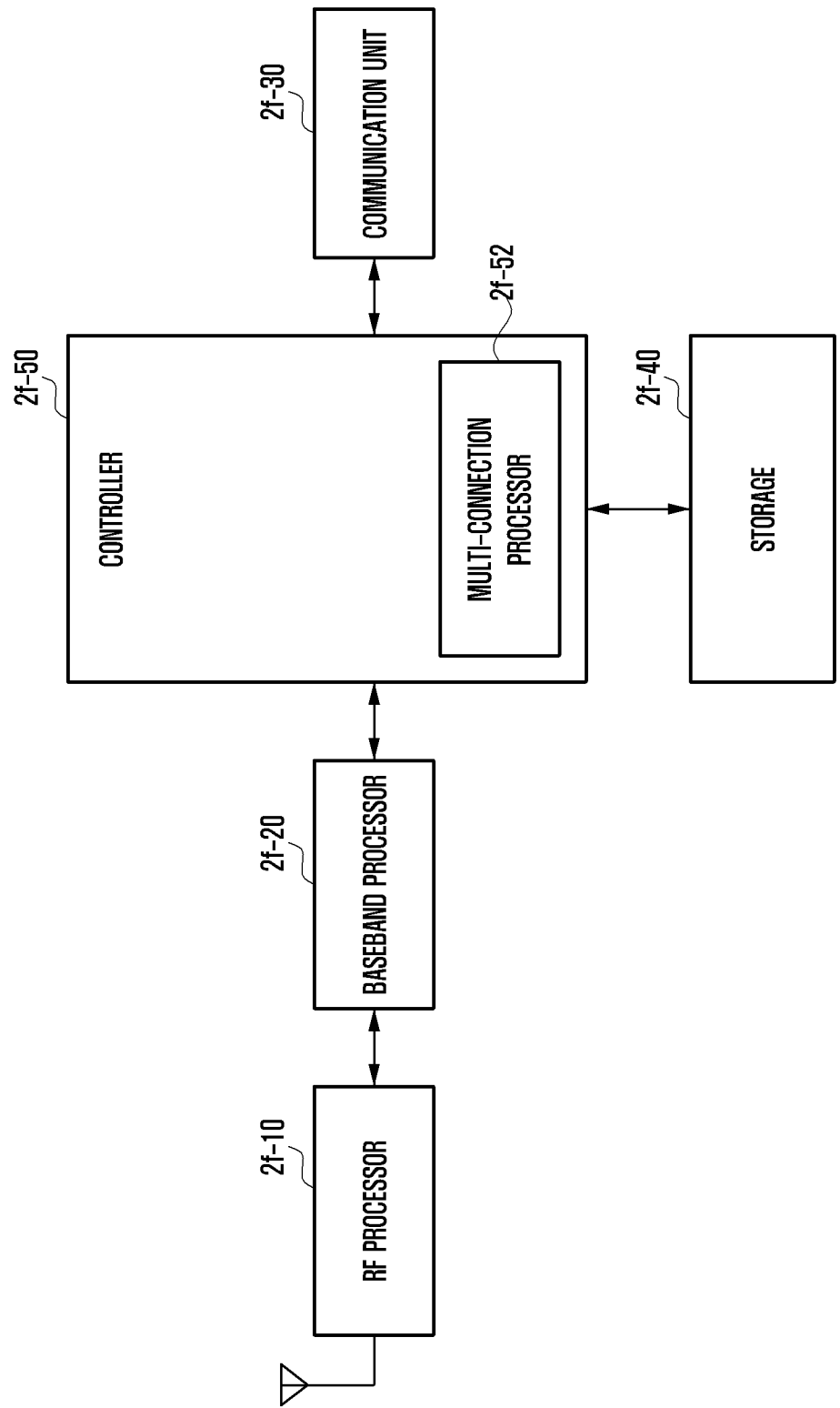
FIG. 2F is a block diagram illustrating the configuration of an NR base station according to an embodiment of the disclosure.

FIG. 2F is a block diagram illustrating the configuration of an NR base station according to an embodiment of the disclosure.

Referring to FIG. 2F, the base station may include an RF processor 2f-10, a baseband processor 2f-20, a backhaul communication unit 2f-30, a storage unit 2f-40, and a controller 2f-50. As a matter of course, the base station is not limited to the example, and may include fewer or more components than the components of FIG. 2F.

The RF processor 2f-10 may perform a function, such as band conversion and amplification of a signal, in order to perform signal transmission or reception via a wireless channel. That is, the RF processor 2f-10 up-converts a baseband signal provided from the baseband processor 2f-20 into an RF band signal and transmits the RF band signal via an antenna, and down-converts an RF band signal received via an antenna into a baseband signal. For example, the RF processor 2f-10 may include a transmission filter, a reception filter, an amplifier, a mixer, an oscillator, a DAC, an ADC, and the like. Although FIG. 2f illustrates a single antenna, the RF processor 2f-10 may include a plurality of antennas. In addition, the RF processor 2f-10 may include a plurality of RF chains. Moreover, the RF processor 2f-10 may perform beamforming. For the beamforming, the RF processor 2f-10 may control the phase and the size of each signal transmitted or received via a plurality of antennas or antenna elements. The RF processor may perform a downlink MIMO operation by transmitting one or more layers.

The baseband processor 2f-20 may perform a function for conversion between a baseband signal and a bitstream according to the physical layer standard of a first radio access technology. For example, in the case of data transmission, the baseband processor 2f-20 encodes and modulates a transmission bitstream, so as to produce complex symbols. In addition, in the case of data reception, the baseband processor 2f-20, restores a reception bitstream by demodulating and decoding a baseband signal provided from the RF processor 2f-10. For example, according to the OFDM scheme, in the case of data transmission, the baseband processor 2f-20 produces complex symbols by encoding and modulating a transmission bitstream, maps the complex symbols to subcarriers, and then configures OFDM symbols via an IFFT operation and CP insertion. Further, in the case of data reception, the baseband processor 2f-20 divides a baseband signal provided from the RF processor 2f-10 in units of OFDM symbols, reconstructs signals mapped to the subcarriers via a fast Fourier transform (FFT) operation, and then reconstructs a received bitstream via demodulation and decoding. The baseband processor 2f-20 and the RF processor 2f-10 transmit and receive signals as described above. Accordingly, the baseband processor 2f-20 and the RF processor 2f-10 may be referred to as a transmitter, a receiver, a transceiver, a communication unit, or a wireless communication unit. The base station may perform signal transmission or reception with a UE using the baseband processor 2f-20 and the RF processor 2f-10, and the signal may include control information and data.

The backhaul communication unit 2f-30 provides an interface for performing communication with other nodes in a network. That is, the backhaul communication unit 2f-30 may convert, into a physical signal, a bit stream transmitted from a main base station to another node, for example, a secondary base station, a core network, and the like, and may convert a physical signal received from another node into a bit stream. The backhaul communication unit 2f-30 may be included in a communication unit.

The storage unit 2f-40 may store data, such as a basic program for operating a base station, an application program, configuration information, and the like. The storage 2f-40 may store information associated with a bearer allocated to a connected UE, a measurement result reported from a connected UE, and the like. In addition, the storage 2f-40 may store information which is a criterion for determining whether to provide or suspend multiple connections to a UE. The storage 2f-40 may provide data stored therein in response to a request from the controller 2f-50. The storage 2f-40 may be configured as a storage medium such as ROM, RAM, hard disk, CD-ROM, DVD, and the like, or a combination of storage media. In addition, the storage 2f-40 may include a plurality of pieces of memories. According to some embodiments, the storage 2f-40 may store a program for implementing a buffer state reporting method according to the disclosure.

The controller 2f-50 may control the overall operation of the base station. For example, the controller 2f-50 may perform transmission or reception of a signal via the baseband processor 2f-20 and the RF processor 2f-10, or via the backhaul communication unit 2f-30. Further, the controller 2f-50 records data in the storage 2f-40 and reads the recorded data. To this end, the controller 2f-50 may include at least one processor. In addition, at least one configuration included in the base station may be implemented as a single chip.

FIG. 2G is a flowchart illustrating a process of providing a measurement report according to a received signal strength indicator (RSSI) configuration in LTE, showing a comparison between the disclosure and the conventional technology.

Referring to FIG. 2G, a UE 2g-1 may be connected to a serving cell 2g-5 of a serving base station. The base station transmits, to the UE 2g-1, RMTC information (rmtc-period: the period of an RMTC in a frequency specified in a corresponding measurement object, rmtc-SubframeOffset: the subframe offset of a rmtc time window in a frequency specified in a corresponding measurement object, measDuration: the number of consecutive symbols for which the physical layer reports samples of RSSI), which is measurement object information corresponding to a configured measurement ID. In addition, the serving base station may transmit, to the UE 2g-1, measRSSI_ReportConfig which includes channelOccupancyThreshold: an RSSI threshold value used for calculating a channel occupancy, and reportInterval: a period for calculating an RSSI value and a channel occupancy value in operation 2g-10. If the UE 2g-1 receives the information 2g-10, the UE 2g-1 may apply the signaled RMTC value and may start measuring an RSSI value for the corresponding measID in operation 2g-15. After starting the measurement, the UE 2g-1 may calculate an average value of RSSI sample values obtained from L1 during reportInterval, and may use the average value for an RSSI result report. In addition, the UE 2g-1 may report a rounded percentage of RSSI sample values which are greater than or equal to the channelOccupancy threshold value among the total RSSI samples obtained during reportInterval given in operation 2g-10, to the base station as a channel occupancy in operation 2g-20. The UE 2g-1 may report the RSSI result report value and the channel occupancy value which are measured and calculated during Reportinterval, to the service base station 2g-5, in operation 2g-25. The report may be repeatedly provided at intervals of reportInterval 2g-30.

FIG. 2H is a flowchart illustrating a process of providing a measurement report according to a discovery reference signal (DRS) configuration in LTE, showing a comparison between the disclosure and the conventional technology.

Referring to FIG. 2H, a UE 2h-1 may be connected to a serving cell 2h-5 of a serving base station. The base station may transmit, to the UE 2h-1, a DRS periodicity per frequency, a DRS offset per frequency: SFN based offset in subframe unit, ds-OccasionDuration: indicates the duration of discovery signal occasion for this frequency, measCSI-RS-Id: the CSI-RS ID of a CSI-RS to be measured, physCellId: the cell id of a cell in which a corresponding CSI-RS is transmitted, scramblingIdentity: a pseudo random sequence generator, resourceConfig: a CSI-RS resource configuration, subframeOffset: indicates the subframe offset between SSS of the cell indicated by physCellId and the CSI-RS resource in a discovery signal occasion, csi-RS-IndividualOffset: and CSI-RS individual offset applicable to a specific CSI-RS resource in association with a predetermined frequency, as measurement object information corresponding to a configured measurement ID. In addition, the serving base station may transfer events A1 to A7 and B1 and B2 as report configuration information, so as to measure a corresponding DRS. In this instance, if an event is identified as being satisfied by comparing a signal strength between the serving cell 2h-5 and a predetermined cell existing in the measurement object, a report may be transferred to the serving base station 2h-5. Accordingly, in operation 2h-10, an event may be transmitted to the UE 2h-1. Upon reception of the information, the UE 2h-1 may apply a DMTC to a DRS existing in the measurement object, and may start performing a measurement using triggerQuantity configured in reportConfig in operation 2h-15. After starting the measurement, the UE 2h-1 may continuously evaluate whether an event configured in report config of the DRS existing in the corresponding measurement object is satisfied in operation 2h-20. In this process, if the signaled event is satisfied, measurement result values associated with the serving cell and a neighboring cell, in association with a neighboring cell corresponding to the event to a lower layer in operation 2h-25. The UE 2h-1 may transfer the delivered measurement report to the serving base station 2h-5 in operation 2h-30.

Figure 2I:
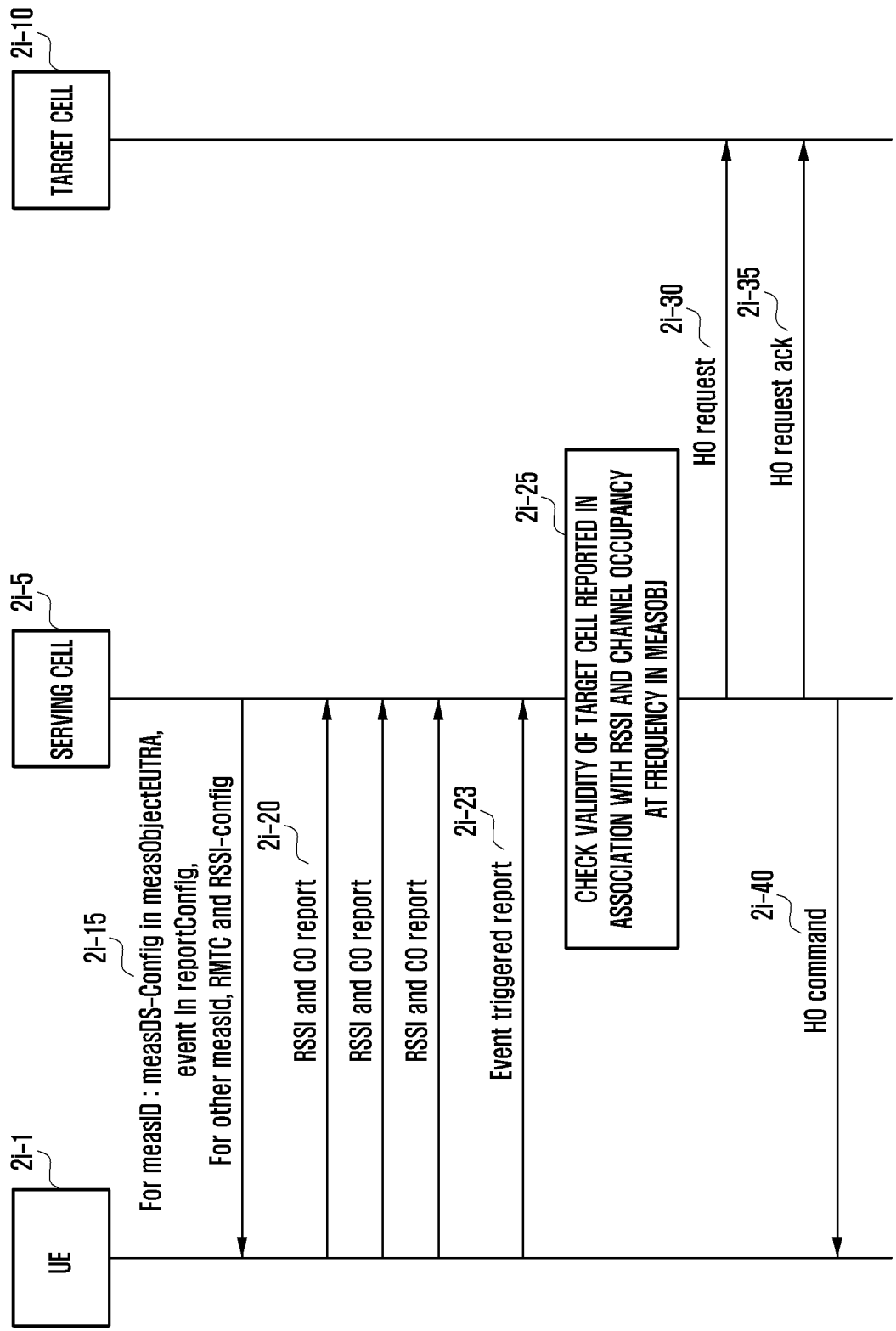
FIG. 2I is a flowchart illustrating a process of performing a handover according to an RSSI configuration and a DRS configuration in LTE, showing a comparison between the disclosure and the conventional technology.

FIG. 2I is a flowchart illustrating a process of performing a handover according to an RSSI configuration and a DRS configuration in LTE, showing a comparison between the disclosure and the conventional technology.

Referring to FIG. 2I, a UE 2i-1 may be connected to a serving base station 2i-5. The serving base station 2i-5 may transmit information, which is transmitted in operation 2h-10 of FIG. 2H, to the UE 2i-1 as measurement object configuration information and report configuration information via a predetermined measID. In addition, information, which is transmitted in operation 2g-10 of FIG. 2G, may be transmitted to the UE 2i-1 via a separate measID. In this embodiment, the objects of the two measurement configurations, that is, the measurement objects for a DRS and an RSSI need to indicate the same frequency. The two measurements may be included in a single RRC reconfiguration message for delivery, or may be included in different RRC reconfiguration messages and may be delivered sequentially. Upon reception of the information, the UE 2i-1 may start measurement using corresponding measurement object information for each of the DRS configuration and the RSSI configuration, and may perform reporting according to the corresponding report config. For example, the UE 2i-1 may report an RSSI and channel occupancy information to the serving base station 2i-5 for each report interval according to the RSSI configuration in operation 2i-20. Subsequently, if a DRS-based event is satisfied, the UE 2i-1 may report a measurement result associated with the corresponding event to the serving base station 2i-5 in operation 2i-23. The serving base station 2i-5 that receives the report may determine whether to perform a handover to a target cell 2i-10 that satisfies the event in operation 2i-23, based on the RSSI and channel occupancy information of the corresponding frequency. If it is identified that the RSSI and channel occupancy report values in association with the frequency in which the reported target cell 2i-10 is present are sufficiently low in operation 2i-35, the serving base station 2i-5 may perform transmission or reception of a HO request 2i-30 and a HO request ack 2i-35 with the target cell 2i-10. When the target cell 2i-10 transmits the HO request ack to the serving base station 2i-5, the serving base station 2i-5 may transfer a HO command to the UE 2i-1, so as to enable an HO in operation 2i-40.

FIG. 2J is a flowchart illustrating a process of operating a conditional handover in an unlicensed band according to an embodiment of the disclosure.

Referring to FIG. 2J, a UE 2j-1 is connected to a serving base station 2j-5. The serving base station 2j-5 transmits, DMTC information, RMTC information, RSSI configuration information and the like in association with a single object frequency to the UE 2j-1 via an RRC dedicated message, independently from the operation of a conditional handover. The serving base station 2j-5 may transmit information, which is transmitted in operation 2h-10 of FIG. 2H, to the UE 2j-1 as measurement object configuration information and report configuration information via a predetermined measID. In addition, information, which is transmitted in operation 2g-10 of FIG. 2G, may be transmitted to the UE 2j-1 via a separate measID. In this embodiment, the objects of the two measurement configurations, that is, the measurement objects for a DRS and an RSSI need to indicate the same frequency. In addition to the information transferred in operation 2h-10 and 2g-10 via the measurement object, SSBfrequency information, SSB carrier spacing information, SMTC: SSB measurement timing configuration information, and additionally configured CSI-RS configuration information may be added. The information may be transmitted in operation 2j-15. In the information, information related to a DRS may be configured in one measure ID, and information related to an RSSI may be configured in the other measure ID. The measurement configurations may be delivered sequentially via different RRC reconfiguration messages, or may be delivered via the same RRC reconfiguration message. Upon reception of the information, the UE 2j-1 may perform measurement by applying the corresponding measurement object and report configuration with reference to each measurement ID. The UE 2j-1 may report an RSSI and a channel occupancy value obtained during a previously configured reportInterval to the serving base station 2j-5 as a measurement result obtained according to the RSSI configuration in operation 2j-20. Alternatively, if a previously configured report triggering event is satisfied as a result of the measurement according to the DRS configuration, the UE 2j-1 may report the corresponding measurement result and event to the serving base station 2j-5 in operation 2j-25. If the serving base station 2j-5 determines that a frequency in which a reported target candidate cell 2j-10 is present is less than or equal to a predetermined RSSI and a predetermined channel occupancy level, after receiving the corresponding measurement report 2j-25, and also taking into consideration the RSSI and channel occupancy report 2j-20, the serving base station 2j-5 may consider the reported target candidate cell 2j-10 as a candidate target cell for the conditional handover in operation 2j-30. The serving base station 2j-5 may transmit a conditional handover request to the base station 2j-10 of the selected candidate target cell in operation 2j-35. If the base station 2j-10 of the candidate target cell transmits an ack to the serving base station 2j-5 in operation 2j-40, the serving base station 2j-5 may transfer conditions for performing a conditional handover and candidate target cell information to the UE 2j-1 in operation 2j-45. The transmission may be a separate container indicating a conditional handover, or may be a separate indicator which indicates a conditional handover and is included in a container. Based on the container or the indicator, the UE 2j-1 may identify that a corresponding measurement configuration corresponds to a conditional handover. The information delivered in this stage may be as follow.

measObj information:
SSB frequency information
SSB carrier spacing information
Smtc: ssb measurement time configuration information
Reference freq of CSI-Rs information
DMTC configuration information
DRS (discovery reference signal) periodicity per SSB frequency
DRS offset per frequency: SFN based offset in subframe unit
ds-OccasionDuration: Indicates the duration of discovery signal occasion for this SSB frequency.
CSI-Rs config for DRS
measCSI-RS-Id: CSI-RS ID of a CSI-RS to be measured
physCellId: cell id of a cell in which a corresponding CSI-RS is transmitted
scramblingIdentity: pseudo random sequence generator
resourceConfig: CSI-RS configuration information
subframeOffset: Indicates the subframe offset between SSS of the cell indicated by physCellId and the CSI-RS resource in a discovery signal occasion
csi-RS-IndividualOffset: CSI-RS individual offset applicable to a specific CSI-RS resource
RMTC configuration information
rmtc-Period: RMTC periodicity
rmtc-SubframeOffset: subframe offset of rmtc time window in SSB frequency,
measDuration: Number of consecutive symbols for which the Physical Layer reports samples of RSSI,
reportConfig
DRS-based RSRP, RSRQ-based measurement triggering event (i.e., events of A1 to A6 or B1 and B2 of LTE)
measRSSI-ReportConfig
channelOccupancyThreshold: RSSI threshold value to be used for calculating channel occupancy
minimumCO level: a channel occupancy threshold value below which a percentage value needs to fall, wherein the percentage value is the percentage of samples which are greater than or equal to the channelOccupancyThreshold value among RSSI sample values transferred from a lower layer during CO_meas_duration.
minimum RSSI value: a threshold value below which an average value needs to fall, wherein the average value is the average of RSSI sample values transferred from a lower layer during the CO_meas_duration.
CO_meas_duration: a time interval needed for calculating the average of RSSI sample values transferred from a lower layer, or needed for calculating a channel occupancy value.

In the measurement object information, RMTC information may be replaced with information included in DMTC, or may be a subset thereof. That is, a frequency/time interval for measuring a DRS according to a DMTC may be the super set of a frequency/time interval for measuring an RSSI according to an RMTC, or a frequency/time interval for measuring an RSSI according to the RMTC may be the super set of a frequency/time interval for measuring a DRS according to the DMTC. In the above-mentioned cases, a superset may be transferred via only configuration information. In this instance, the UE may measure a DRS and an RSSI only based on the information associated with the super set. As another example, if RMTC configuration information is not separately signaled, but an RSSI needs to be measured as a basic measurement value for calculating an RSRP or an RSRQ, by measuring an SSB in the same manner as SS-RSSI-measurement of NR, measurement slot information associated with a measurement slot in which RSSI measurement is performed, symbol information associated with a symbol in which a UE measures an RSSI within a slot, and the like, which are based on an SMTC, may be delivered instead of the separate information of the RMTC.

The information is basically dependent upon SSB frequency information. That is, the DMTC and the RMTC may be time information of RSs belonging to the SSB frequency.

When the information is delivered to the UE 2*j*-1, all the information may be separately transferred as measurement configuration information including a conditional handover indication. Alternatively, the configuration delivered in operation 2*j*-15 may be replaced with a delta configuration that omits duplicated information in measObject and reportConfig in the same measurement id, as compared with the measurement configuration information transferred in operation 2*j*-15, and transmits only information that needs to be modified. In addition to the measurement information, candidate target cell information may be delivered together, for each pair of corresponding measurement object and report configuration information. The candidate target cell information may be cell information (PCI and CGI information) of the corresponding cell, random access preamble information and resource time and frequency available in the cell, available SSB information, and the like, time information associated with a time during which the corresponding random access preamble and resource are available, timer information used for determining a failure when a handover is performed in the corresponding cell, or the like. Multiple candidate target cells may be present, and the above-mentioned measurement configuration may be applied for each candidate target cell group. If the measurement configuration is applied for each group, a final candidate target cell may be selected according to UE implementation, or a cell having the best signal strength (RSRQ, RSRP, or SINR) among candidate cells satisfying a corresponding event may be selected.

The UE 2*j*-1 that receives the information may perform a measuring according to the given configuration. That is, the UE 2*j*-1 may perform a DMTC-based measurement and an RMTC-based measurement (RSSI/CO measurement) in parallel in operation 2*j*-50. Until a conditional handover is performed after the start of the measurement, the UE 2*j*-1 may not report a measurement result obtained according to the measurement configuration to the serving base station 2*j*-5.

In the case in which a DRS-based measurement and an event associated the measurement are satisfied while the UE 2*j*-1 is performing the measurement, if it is identified that the average value of RSSI sample values measured during the latest CO_meas_duration exceeds the minimum RSSI value, or the channel occupancy value measured during the latest CO_meas_duration exceeds the minimumCO level, in consideration of an RSSI/CO measurement result in an SSB frequency in which a DRS is configured, the UE 2*j*-1 may not perform a conditional handover associated with the triggered DRS-based event. According to another embodiment, the UE may perform a conditional handover by determining whether the following condition is satisfied, as opposed to by sequentially making decisions. {a DRS-based measurement and an event associated with the measurement should be satisfied} and {{the average value of RSSI sample values measured during the latest CO_meas_duration should not exceed the minimum RSSI value} and/or {the channel occupancy value measured during the latest CO_meas_duration should not exceed the minimumCO level}} As another example, if an RMTC-based measurement value satisfies the condition {{the average value of RSSI sample values measured during the latest CO_meas_duration should not exceed the minimum RSSI value} and/or {the channel occupancy value measured during the latest CO_meas_duration should not exceed the minimumCo level}}, a conditional handover may be performed irrespective of which DMTC-based event configured for an SSB frequency associated with the corresponding RMTC is satisfied. The process is performed in operation 2*j*-55.

If the UE 2*j*-1 is determined to perform a conditional handover in operation 2*j*-55, the UE 2*j*-1 may perform a handover by selecting one of the candidate target cells associated with the DMTC-based or the DMTC and RMTC-based satisfied event. If a single candidate target cell that is associated with the DMTC-based or the DMTC and RMTC-based satisfied event is present, the conditional handover is performed to the single cell. If multiple candidate target cells are present, a cell that has the best report quantity or the best measurement quantity may be selected. The UE 2*j*-1 may perform random access with respect to the selected target cell 2*j*-10 using the given random access preamble or random access resource in operation 2*j*-60, and may receive a random access response from the target cell 2*j*-10 in operation 2*j*-65. Upon reception of the response, the UE 2*j*-1 may transfer a handover complete message to the target cell 2*j*-10 via an RRC message.

Figure 2K:
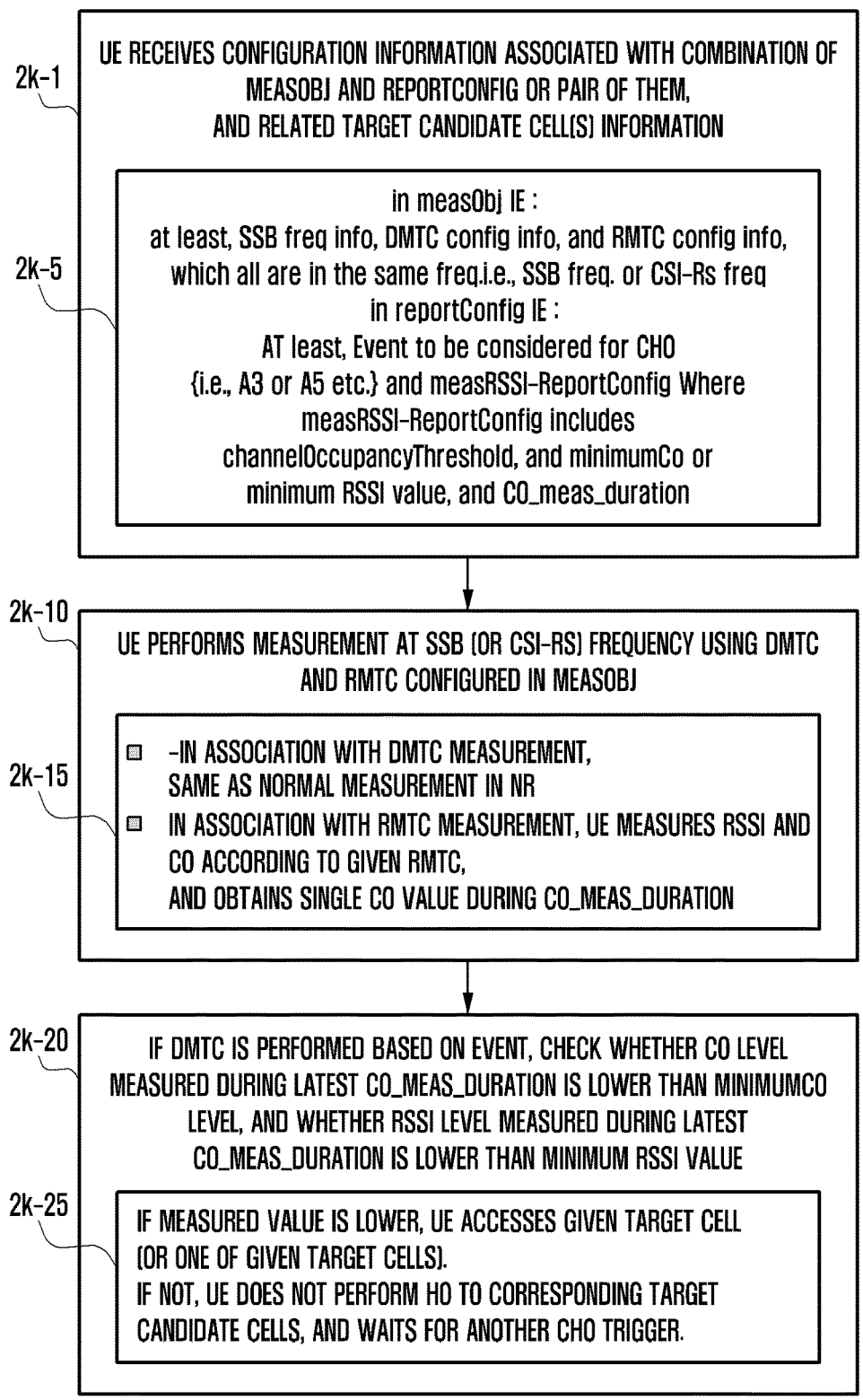
FIG. 2K is a flowchart illustrating the operation of a UE when a conditional handover is operated in an unlicensed band according to an embodiment of the disclosure.

FIG. 2K is a flowchart illustrating the operation of a UE when a conditional handover is operated in an unlicensed band according to an embodiment of the disclosure.

Referring to FIG. 2K, in operation 2*k*-1, the UE may receive, from a serving base station, a measurement object and a report configuration for a conditional handover, or partially new information of the measurement object and report configuration information of a predetermined measurement ID for a conditional handover in order to replace the existing measurement configuration. The delivered pair of the measurement object and report configuration information for the conditional handover may be connected to candidate target cell information again, and the corresponding candidate target cell information may also be delivered to the UE. Particularly, the same information mentioned in operation 2*j*-45 of FIG. 2*j* may be delivered as the information in operation 2*k*-5.

The UE that receives the delivered information may apply a DMTC and a RMTC and simultaneously measure a DRS existing in a SSB frequency signaled via the measurement object in operation 2*k*-10. The DMTC-based measurement may continuously evaluate whether events A1 to A6 and B1 and B2 are satisfied based on an event triggered report from the perspective of time, based on the measurement object information and the report configuration information in the existing NR. Based on a signaled CO_meas_duration, the RMTC-based measurement may calculate an RSSI average value and a channel occupancy value during the corresponding time interval in operation 2*k*-15.

In operation 2*k*-20, as described in FIG. 2J, in the case in which the DRS-based measurement and an event associated the measurement are satisfied while the UE is performing the measurement, if it is identified that the average value of RSSI sample values measured during the latest CO_meas- _duration exceeds the minimum RSSI value, or the channel occupancy value measured during the latest CO_meas_duration exceeds the minimumCO level, in consideration of an RSSI/CO measurement result obtained in the SSB frequency in which a DRS is configured, the UE may not perform a conditional handover associated with the triggered DRS-based event. If the average value of RSSI sample values is less than the minimum RSSI value, or the channel occupancy value is less than the minimumCO level, the UE may perform a conditional handover in operation 2*k*-25. According to another embodiment, the UE may perform a conditional handover by determining whether the following condition is satisfied, as opposed to by sequentially making decisions. {a DRS-based measurement and an event associated with the measurement should be satisfied} and {{the average value of RSSI sample values measured during the latest CO_meas_duration should not exceed the minimum RSSI value} and/or {the channel occupancy value measured during the latest CO_meas_duration should not exceed the minimumCO level}}. As another example, if an RMTC-based measurement value satisfies the condition {{the average value of RSSI sample values measured ring the latest CO_meas_duration should not exceed the minimum RSSI value} and/or {the channel occupancy value measured during the latest CO_meas_duration should not exceed the minimumCo level}}, a conditional handover may be performed, irrespective of which DMTC-based event configured for an SSB frequency associated with the RMTC is satisfied. The process is performed in operation 2*j*-55.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication system, the method comprising:
   receiving, from a base station, a radio resource control (RRC) reconfiguration message including a conditional reconfiguration for at least one candidate target cell, wherein the conditional reconfiguration includes an RRC reconfiguration for each of the at least one candidate target cell, wherein the RRC reconfiguration for each of the at least one candidate target cell includes a timer associated with a failure of a conditional handover and random access channel (RACH) configuration information, and wherein the conditional reconfiguration includes at least one measurement identifier (ID), each of the at least one measurement ID being associated with an event and the event being associated with an offset value;
   performing a measurement based on the conditional reconfiguration; and
   in case that an event associated with a measurement ID among the at least one measurement ID is fulfilled based on the measurement:
   selecting a target cell fulfilling the event among the at least one candidate target cell for execution of the conditional reconfiguration; and
   executing the conditional reconfiguration for the conditional handover to the target cell, and starting the timer.

2. The method of claim 1, wherein the each of the at least one measurement ID corresponds to a measurement object associated with a reporting configuration.

3. The method of claim 1, further comprising:
   in case that a random access on the target cell is successful, stopping the timer.

4. A user equipment (UE) in a wireless communication system, the UE comprising:
   a transceiver; and
   a controller coupled to the transceiver, wherein the controller is configured to:
   receive, from a base station, a radio resource control (RRC) reconfiguration message including a conditional reconfiguration for at least one candidate target cell, wherein the conditional reconfiguration includes an RRC reconfiguration for each of the at least one candidate target cell, wherein the RRC reconfiguration for each of the at least one candidate target cell includes a timer associated with a failure of a conditional handover and random access channel (RACH) configuration information, and wherein the conditional reconfiguration includes at least one measurement identifier (ID), each of the at least one measurement ID being associated with an event and the event being associated with an offset value,
   perform a measurement based on the conditional reconfiguration, and
   in case that an event associated with a measurement ID among the at least one measurement ID is fulfilled based on the measurement:
   select a target cell fulfilling the event, among the at least one candidate target cell for execution of the conditional reconfiguration, and
   execute the conditional reconfiguration for the conditional handover to the target cell, and start the timer.

5. The UE of claim 4, wherein the each of the at least one measurement ID corresponds to a measurement object associated with a reporting configuration.

6. The UE of claim 4, wherein the controller is configured to:
   in case that a random access on the target cell is successful, stop the timer.

* * * * *